US012344416B2

(12) United States Patent
Gerber

(10) Patent No.: US 12,344,416 B2
(45) Date of Patent: Jul. 1, 2025

(54) DEVICE AND METHOD FOR SETTING UP CONTAINERS HAVING A FUNCTIONAL EDGE FROM FLAT BLANKS

(71) Applicant: Gietz AG, Gossau (CH)

(72) Inventor: Marcel Gerber, Zürich (CH)

(73) Assignee: GIETZ AG, Gossau (CH)

( * ) Notice: Subject to any disclaimer, the term of this patent is extended or adjusted under 35 U.S.C. 154(b) by 50 days.

(21) Appl. No.: 18/007,792

(22) PCT Filed: Jun. 1, 2021

(86) PCT No.: PCT/EP2021/064613
§ 371 (c)(1),
(2) Date: Dec. 2, 2022

(87) PCT Pub. No.: WO2021/245052
PCT Pub. Date: Dec. 9, 2021

(65) Prior Publication Data

US 2023/0257147 A1 Aug. 17, 2023

(30) Foreign Application Priority Data

Jun. 3, 2020 (CH) .................................. 000659/20

(51) Int. Cl.

| | |
|---|---|
| ***B65B 47/06*** | (2006.01) |
| ***B31B 50/46*** | (2017.01) |
| ***B31B 50/98*** | (2017.01) |
| *B31B 100/00* | (2017.01) |
| *B31B 120/00* | (2017.01) |

(52) U.S. Cl.
CPC .............. *B65B 47/06* (2013.01); *B31B 50/46* (2017.08); *B31B 50/98* (2017.08); *B31B 2100/0024* (2017.08); *B31B 2120/002* (2017.08)

(58) Field of Classification Search
CPC ......... B65B 47/06; B31B 50/46; B31B 50/98; B31B 2100/0024; B31B 2120/002; B31B 50/44
See application file for complete search history.

(56) References Cited

U.S. PATENT DOCUMENTS 2,328,563 A 9/1943 Lichter
3,135,455 A 6/1964 Santangelo
(Continued)

FOREIGN PATENT DOCUMENTS

BE 659186 A 5/1965
DE 91 14 410 U1 4/1992
(Continued)

*Primary Examiner* — Anna K Kinsaul
*Assistant Examiner* — Mobeen Ahmed
(74) *Attorney, Agent, or Firm* — Rankin, Hill & Clark LLP

(57) ABSTRACT

A device for setting up containers along fold lines from flat blanks, having a forming station including a forming tool having a displaceable forming punch, and a backing device for setting up the containers from the blanks, and having a discharging device for carrying away the set-up containers from the forming station. The forming station is designed for folding a circumferential functional edge. The device is designed for turning the set-up containers after the forming station and for pushing the containers over preceding containers for forming a container stack having the container openings thereof facing forward.

20 Claims, 9 Drawing Sheets

(56) References Cited

U.S. PATENT DOCUMENTS

| | | | | | |
|---|---|---|---|---|---|
| 3,191,508 | A | 6/1965 | Beamish | | |
| 3,941,037 | A * | 3/1976 | Reichert | B65B 35/50 | 493/449 |
| 3,973,722 | A * | 8/1976 | Hosoe | B65D 5/2047 | 229/170 |
| 4,197,789 | A * | 4/1980 | Moen | B31B 50/44 | 493/167 |
| RE30,325 | E * | 7/1980 | Waldbauer | B31B 50/00 | 493/151 |
| 4,295,839 | A * | 10/1981 | Baker | B65D 5/246 | 493/143 |
| 4,308,023 | A * | 12/1981 | Bidegain | B31B 50/44 | 493/457 |
| 4,345,905 | A * | 8/1982 | Moen | B31B 50/46 | 493/131 |
| 4,368,095 | A * | 1/1983 | Gross | B65B 47/02 | 156/499 |
| 4,417,882 | A * | 11/1983 | Wallin | B65D 5/246 | 493/174 |
| 4,516,210 | A * | 5/1985 | Dahlke | G05B 19/0426 | 493/1 |
| 4,522,618 | A * | 6/1985 | Stannard | B31B 50/00 | 493/143 |
| 4,626,234 | A * | 12/1986 | Oxborrow | B31B 70/00 | 493/134 |
| 4,832,675 | A * | 5/1989 | Stearns | B31B 70/00 | 493/143 |
| 4,861,325 | A * | 8/1989 | DiMarzio | B31B 50/00 | 493/151 |
| 5,256,129 | A * | 10/1993 | Boix Jaen | B31B 50/00 | 493/171 |
| 5,523,046 | A * | 6/1996 | Weder | B29C 51/262 | 425/383 |
| 5,656,007 | A * | 8/1997 | Olson | B65D 5/323 | 493/90 |
| 8,608,887 | B1 * | 12/2013 | Parcels | B65D 81/057 | 156/196 |
| 8,613,612 | B2 * | 12/2013 | Middleton | B65D 5/209 | 425/129.1 |
| 10,913,231 | B2 * | 2/2021 | Marsh | B31B 50/44 | |
| 11,173,683 | B2 * | 11/2021 | Trento | B31B 50/86 | |
| 11,529,786 | B2 * | 12/2022 | Crackett | B31B 50/46 | |
| 2005/0109653 | A1 * | 5/2005 | Wnek | B65D 1/34 | 206/515 |
| 2006/0183616 | A1 * | 8/2006 | Fulkerson | B31B 50/80 | 493/51 |
| 2006/0183617 | A1 * | 8/2006 | Alexander | B31B 70/00 | 493/70 |
| 2007/0037682 | A1 * | 2/2007 | Scholtes | B31B 50/44 | 493/175 |
| 2009/0223952 | A1 * | 9/2009 | Wnek | B65D 1/34 | 219/730 |
| 2010/0147938 | A1 * | 6/2010 | Littlejohn | B65D 1/34 | 229/407 |
| 2010/0263333 | A1 * | 10/2010 | Langen | B65D 5/02 | 53/563 |
| 2015/0217884 | A1 * | 8/2015 | Zwaga | B32B 37/10 | 156/196 |
| 2017/0305097 | A1 * | 10/2017 | Räsänen | B31F 1/0077 | |
| 2018/0319116 | A1 * | 11/2018 | Haug | B31B 50/594 | |
| 2019/0160774 | A1 * | 5/2019 | Langen | B31B 50/0042 | |
| 2020/0114611 | A1 * | 4/2020 | Marsh | B31B 50/005 | |
| 2021/0053712 | A1 * | 2/2021 | Hargreaves | B65B 47/04 | |
| 2021/0237387 | A1 * | 8/2021 | Tanaka | B65D 43/0218 | |
| 2022/0410522 | A1 * | 12/2022 | Rodot | B31B 50/44 | |
| 2023/0182428 | A1 * | 6/2023 | Whatling | B65D 5/2047 | 229/169 |
| 2023/0339632 | A1 * | 10/2023 | Doelker | B65B 5/02 | |

FOREIGN PATENT DOCUMENTS

| | | | |
|---|---|---|---|
| DE | 43 18 004 | A1 | 12/1994 |
| DE | 299 05 241 | U1 | 7/1999 |
| DE | 102 48 231 | A1 | 4/2003 |
| DE | 10 2005 020 617 | A1 | 12/2005 |
| EP | 0 022 139 | A1 | 1/1981 |
| EP | 0 761 424 | A1 | 3/1997 |

* cited by examiner

DEVICE AND METHOD FOR SETTING UP CONTAINERS HAVING A FUNCTIONAL EDGE FROM FLAT BLANKS

BACKGROUND OF THE INVENTION

Field of the Invention

The invention relates to the field of devices for setting up and gluing containers having a functional edge from flat blanks.

Description of Related Art

Devices of the type indicated above are disclosed, for example, in the patent publications DE 10 2005 020 617 A1, DE 102 48 231 A1, DE 299 05 241 U1, EP 0 761 424 A1, and DE 43 18 004 A1.

In such devices, flat blanks are formed or set up into containers having a container receptacle. The flat blanks, for example, form a base part and side wall parts and adhesive tabs delimited from each other by predefined fold lines.

The flat blanks are fed into a forming station disposed in the device for setting up the containers. In the forming station, containers are set up from the blanks by means of a forming punch and glued along the adhesive tabs.

The containers are produced from flat blanks by means of a device as indicated above and are typically made of cardboard or a laminar composite including cardboard as a substrate.

The containers are used, for example, for receiving fresh food products such as fruit, for example strawberries, blueberries, or raspberries, as well as vegetables or mushrooms. Such containers typically do not have an integrated cover, but rather present as shells. The filled shells are typically wrapped in a transparent plastic film, so that the packaged contents cannot fall out of the container receptacle and are protected against environmental influences.

The containers are further also used for receiving deep-frozen foods, such as lasagna.

The containers are further also used as eating and/or transporting containers in the fast-food field.

The containers indicated above have the disadvantage that the containers and the container openings thereof cannot be sealed completely liquid-tight and particularly also not gas-tight.

Comparable containers are known, particularly shells, allowing liquid-tight and potentially also gas-tight sealing. The containers, however, are deep-drawn or thermoformed containers made of plastic. The containers include a circumferential, laterally protruding sealing edge in the region of the container opening on which a sealing film, for example made of plastic, can be sealed. Such deep-drawn or thermoformed containers, however, cannot be produced from a renewable material such as cardboard.

Comparable containers produced from fiber slurry (pulp) and pressed into a container mold are further known. Such containers, however, do not have the desired appearance as is achieved with containers formed from blanks.

SUMMARY OF THE INVENTION

It is therefore an object of the present invention to propose a device of the type indicated above and an associated method allowing the production of a container having a sealing edge, particularly having a circumferential sealing edge.

A further disadvantage of the containers produced by means of a device indicated above is the unsatisfactory handling of the containers. The containers thus typically do not have a holding edge that would allow, for example, holding the container filled with hot contents.

It is therefore a further object of the present invention to propose a device of the type indicated above and an associated method allowing the production of a container having a holding edge, particularly having a circumferential holding edge.

The sealing or holding edge indicated above is referred to hereinafter as a functional edge due to the potential multi-functional use thereof.

In conjunction with producing containers having a functional edge from blanks, a further challenge is discharging the containers following setting up the containers by the forming punch.

It is thus known to push, by means of the forming punch, the containers set up in the forming station from blanks into the container receptacle of a preceding container, each having the base facing forward, for forming a stack of containers pushed into each other. The prior art cited in the introduction to the description, for example, describes stack forming of the type indicated above. Forming a stack of containers pushed into each other is extremely space-saving and is therefore particularly well suited for storing, transporting, and providing the containers.

The type of stacking described above, however, is not suitable for containers having a functional edge of the type described above. There is thus a risk when pushing the containers into each other that the laterally protruding functional edge is set up again, for example in an orientation nearly parallel to the orientation of the container side wall connected thereto.

It is therefore a further object of the invention to propose a device of the type indicated above allowing the forming of a stack of containers pushed into each other after the containers are set up, without a formed functional edge being compromised.

The objects indicated above are achieved by the features of the independent claims 1 and 13 as well as 15 and 19.

Particular refinements and embodiments of the invention arise from the independent claims, the description, and the drawings.

The term "container" is understood to be a thin-walled, dimensionally stable object forming a container receptacle having a container opening for receiving a product for transporting and/or storing.

The container can include an integrated cover for sealing the container receptacle, wherein the cover is connected to the base body forming the container receptacle, for example by means of a folding edge.

The container can also not include an integrated cover. In the latter case, the container is also known as a shell.

The flat blank and the container produced therefrom is particularly made of cardboard or includes such. The flat blank and the container produced therefrom can thus include or be made of a laminar composite having at least one layer, particularly a carrier layer, made of cardboard and at least one further layer made of a different material, such as plastic or metal, such as aluminum.

The flat blanks include predefined fold lines along which the container is set up. The fold lines can be linear weakening zones along which the container can be set up by folding. The weakening lines can be formed by splining, grooving, scoring, or perforating. The fold lines particularly form folding edges on the set-up container.

The flat blank typically includes a base part forming the subsequent container base, and side wall parts forming the subsequent side walls of the container to be produced. The side wall parts are connected to the base part by means of fold lines. The flat blank can further include adhesive tabs by means of which the side walls of the container are connected to each other in the set-up condition.

The adhesive tabs are connected particularly to one or to two adjacent side wall parts by means of fold lines. In the latter case, the container receptacle is liquid-tight and leak-proof.

The flat blanks are particularly designed for producing conical containers. Conical means that the side walls of the container enclose an angle of greater than 90° (angle degrees) with respect to the base part.

Conical container shapes are particularly selected because such containers can be stacked inside each other for saving space.

The generic device is typically not only designed for setting up the containers but also for applying an adhesive to predefined adhesive locations and for producing adhesive connections when setting up the container. The adhesive connections ensure the shape stability of the set-up container following the forming station.

The device for setting up containers, as seen in the process direction, particularly includes a feeder for feeding in the blanks, a transport device for transporting the blanks along a transport path to the forming station, and a forming station.

The device further particularly includes an adhesive applying station disposed ahead of the forming station along the transport path for applying adhesive to the blanks, and a forming station. The adhesive applying station can also be integrated in the forming station.

The device further particularly includes a discharging device disposed after the forming station for receiving the set-up containers discharged from the forming station.

For performing the method, the flat blank is individually fed from the feeder to the transport device. The flat blank is singulated from a stack on the feeder for this purpose. To this end, a singulating device can be provided.

The flat blank is particularly guided past an adhesive applying station along the transport path, at which an adhesive is applied to the blank at predefined adhesive locations, for example in the form of adhesive dots. The adhesive is particularly applied to adhesive tabs of the blank.

If the adhesive applying station is integrated in the forming station, then the adhesive is applied in the forming station prior to setting up.

The flat blank is then fed into the forming station along the transport path, particularly from above or diagonally from above, and is brought into a forming position. In the forming station, the flat blank is set up to form a container by folding by the motion of a forming punch interacting with a backing device. At the same time, when setting up the container, the predefined adhesive surfaces of the blank are brought together and glued to each other. The forming punch is driven by means of a drive, for example. During a working cycle, the forming punch particularly performs a stroke for forming and setting up and a return stroke along a working axis running correspondingly parallel to the forming direction. The working axis is particularly horizontally oriented. The working axis can also be oriented diagonally upward.

A folding procedure takes place when setting up the container. Particularly the side wall parts are set up relative to the base part by folding and glued by means of the also folded adhesive tabs, so that the container retains the shape thereof after setting up.

The device can optionally include one or more stationary folding devices between the feeder and the forming station, by means of which a pivot edge is folded in a connecting segment between a container cover and the container receptacle, or by means of which laterally protruding functional edges oriented in the transport direction of the blank are folded.

According to a first aspect of the invention, the device for setting up containers along folding edges from flat blanks includes a forming station having a forming tool. The forming tool includes a displaceable forming punch and a backing device for setting up the containers from the blanks.

The forming punch implements a punch end face for interacting with the container base to be formed of the container to be set up when setting up the container. The forming punch further implements at least one first punch side leading laterally away from the punch end face at an angle and interacting with a container side wall to be formed of the container to be set up when setting up the container.

The backing device particularly implements a setup space into which the blank is pressed by means of the forming punch. The backing device brings about the setting up of the container by interacting with the forming punch. The backing device can be implemented by a linkage, for example.

The device can further include a container receiver downstream of the backing device in the process direction and designed for receiving and temporarily holding the set-up and particularly glued container from the forming punch. The container receiver is particularly designed as a counter form.

As mentioned, the device particularly includes a discharging device for carrying away the set-up containers from the forming station.

The discharging device particularly includes a stack guide for forming a stack of set-up containers nesting in each other. The stack guide particularly implements a stack chute for receiving a stack of containers pushed into each other. The stack guide can be implemented by a linkage, for example. The discharging device is downstream of the backing device and as the case may be downstream of the container receiver in the process direction.

The invention according to the first aspect is thus characterized in that a flange segment disposed at an angle to the at least one punch side and facing outward is connected to the at least one punch side, and the forming tool includes at least one folding aid having a displaceable folding tool able to interact with the flange segment such that a functional edge protruding laterally outward is folded out of the blank when setting up the container.

A folding edge is thereby implemented between the functional edge and the side wall. The folding edge is particularly already predefined as a fold line in the blank.

The functional edge of the set-up container can be a sealing edge. The functional edge can be a holding edge. The functional edge can be a sealing and holding edge.

The functional edge particularly lies in the plane of the container opening.

The functional edge runs particularly parallel to the container base.

The functional edge is particularly characterized in that the edge runs into the forming station transverse to the transport direction of the blank.

The functional edge is disposed laterally on the container opening of the set-up container.

According to a refinement, a partially or fully circumferential functional edge is implemented on the container and laterally encloses the container opening. The partially or fully circumferential functional edge is particularly made up of individual functional edge segments.

The functional edge segments can overlap each other particularly in corner zones in the set-up condition of the container. That is, the functional edge segments can implement overlapping regions, particularly in corner zones.

Overlapping functional edge segments can be connected to each other by means of adhesive connections in the overlapping region.

The functional edge segments can also, however, be implemented as a butt or miter joint.

The term “functional edge” in the preceding description can refer both to a functional edge segment and to the functional edge of a container formed of a plurality of functional edge segments, depending on context. “Functional edges” in the present description correspond to the “functional edge segments” introduced above.

The at least one punch side particularly implements a contact surface for acting on a corresponding area, such as a side wall part, of the blank during forming. The contact surface can be continuous or can have cutouts.

The punch end face particularly implements a contact surface for acting on the base part of the blank during forming. The contact surface can be continuous or can have cutouts.

The flange segment can extend along the entire punch side of the forming punch. The flange segment can also extend along only a section along the punch side of the forming punch. The flange segment can also be multipart in design and can be made up of a plurality of flange segments extending over sections along the punch wall of the forming punch.

According to a refinement of the invention, the flange segment includes an inner wall segment to which an outer flange segment is connected. Inner means disposed toward the center of the forming punch and outer means disposed apart from the center of the forming punch.

The inner wall segment is set back by an offset relative to the outer flange part as seen in the forming direction.

The offset is particularly implemented as a step. The offset is particularly used for clamping and fixing the functional edge during the forming thereof. The offset can implement an undercut for fixing the functional edge on the flange segment.

The undercut particularly causes the functional edge to be clamped in the undercut during forming.

The inner wall segment is particularly oriented perpendicular to the working axis of the forming punch. The inner wall segment runs particularly parallel to the punch end face.

The inner wall segment can also be implemented so that overbending of the functional edge takes place in the forming procedure. Overbending means that the functional edge is bent past the final position thereof. Overbending particularly takes place in the direction of the base part. The overbending of the functional edge can lead to better shape stability.

The overbending is only temporary, because the functional edge is displaced back into the end position thereof. This can take place automatically in that the functional edge returns, particularly springs back under elastic forces automatically, that is, passively, into the end position thereof. The functional edge can also be actively bent back into the end position thereof, however.

If overbending of the functional edge shall take place when forming or setting up the container, then the inner wall segment and the working axis of the forming punch particularly form an angle of less than 90°.

The height of the inner wall segment particularly corresponds to the width of the functional edge.

The device is particularly designed for setting up containers having a plurality of side walls, particularly having four side walls. One functional edge is connected to each side wall.

The forming punch correspondingly forms a plurality of punch sides leading laterally away from the punch end face at an angle, particularly four punch sides.

When forming a circumferential functional edge, each punch side can be associated with a flange segment, as described above, for forming a functional edge.

It is also possible, however, that a flange segment of the type described above is associated with only those punch sides at which a functional edge is implemented running transverse to the transport direction.

Functional edges running parallel to the transport direction can, as mentioned above, also be folded in a folding station disposed ahead of the forming station in the process direction.

Each punch side or each flange segment interacts with one folding aid each.

If the container includes four container sides enclosing a rectangular container base, and thus the forming punch includes four punch sides, then the folding aids and the folding tools thereof can each be disposed at a right angle to each other about the forming punch.

According to a refinement of the invention, the forming punch implements two first punch sides opposite each other, each leading away from the punch end face laterally at an angle and each acting on a first container side wall to be formed of the container to be formed or set up when setting up the container.

A first flange segment disposed at an angle to the first punch side and facing outward is connected to each of the first punch sides.

The first punch sides and the first flange segments are particularly disposed opposite each other. The first flange segments run particularly parallel to each other.

The two first flange segments are particularly designed for forming, that is, for folding two first functional edges. The two first functional edges run particularly parallel to each other and are spaced apart from each other. The two functional edges run particularly transverse to the transport direction of the blank.

The forming punch further implements two second punch sides opposite each other, each leading away from the punch end face laterally at an angle and each acting on a second container side wall to be formed of the container to be set up when setting up the container.

A second flange segment disposed at an angle to the second punch side and facing outward is connected to each of the second punch sides.

The second punch sides and the second flange segments are particularly disposed opposite each other. The second flange segments run particularly parallel to each other.

The two second flange segments are particularly designed for forming, that is, for folding two second functional edges. The two second functional edges run particularly parallel to each other and are spaced apart from each other. The two second functional edges run particularly parallel to the transport direction of the blank. The second functional edges are each particularly disposed perpendicular to the first functional edges.

It is also possible, however, that the two functional edges, as mentioned above, are folded in a folding station disposed between the feeder and the forming station. In contrast to the functional edges disposed transverse to the transport direction, functional edges disposed parallel to the transport direction can namely be folded prior to the forming station by comparatively simple means.

The forming tool includes corresponding folding aids each having a displaceable folding tool, each able to interact with the flange segments such that a functional edge protruding laterally outward is formed or folded out of the flat blank when setting up the container.

The folding tool particularly implements a folding edge. The folding tool is a folding blade, for example.

The folding tool is particularly able to act in a corner zone formed between the at least one first punch side and the at least one flange segment when forming the container.

The corner zone between the punch side and flange segment can be a corner line. The corner line can be continuous or interrupted.

The folding tool can be displaced into the motion zone of the forming punch particularly from the side during the forming. That is, the folding tool is displaced toward the forming punch during the forming. The motion zone is defined by the space through which the forming punch is displaced when performing a forming or set-up stroke.

The folding tool can be supported rotatably or pivotably about a geometric axis of rotation. The folding tool can be correspondingly pivotable toward the corner zone.

The folding tool can be part of a rotating body rotatable about a geometric axis of rotation.

According to a refinement, the folding tool is passively driven or displaced. The folding tool is particularly driven, that is, set in motion, by the motion of the forming punch in the forming direction.

To this end, the folding aid includes a stop element designed such that the forming punch displaced in the forming direction while setting up the container contacts the stop element and sets the same in motion. The stop element is coupled to the folding tool such that the folding tool is displaced toward the flange segment into a forming position by the motion of the stop element, as described above.

The stop element is particularly rotatably supported together with the folding tool about a common axis of rotation, so that a rotary motion initiated by the forming punch during the setting up of the container initiates a rotary motion of the folding tool toward the flange segment.

The stop element and the folding tool are particularly physically connected to each other, particularly rigidly connected. The stop element is particularly part of the rotary body indicated above. The stop element can particularly be implemented as a pivot lever.

The folding aid can include returning/restoring means, by means of which the folding tool and particularly the rotary body can be or is displaced back or pivoted back into an initial position after the forming procedure, particularly when pulling back the forming punch.

The return means can be active return means driven actively by means of a drive.

The return means can be passive return means, wherein a return force is exerted on the return means back in the direction of the resting position during a motion out of the resting position thereof.

Passive return means can be spring elements, for example, such as torsional springs or compression springs.

The return means can further also include elements, such as return levers, for interacting with displaced parts of the forming tool, such as the forming punch, and are displaced back into the initial position by the same.

The folding tool of the folding aid can thus be displaced back into an initial position by means of the return stroke of the forming punch acting on a return lever of the folding aid.

The return means indicated above allow passive displacing of the folding tool from a forming position back into the initial position.

The folding tool thus can be fully passively displaced during a forming cycle, that is, with no active drive.

It is also possible that the forming punch is displaced from the initial position toward the folding tool in the direction of the forming position or into the forming position. The folding tool thus does not need to be displaced in order to take on the forming position.

It is also possible that the folding tool or the rotary body is actively driven by means of a drive, that is, actively displaced from the initial position into the forming position.

It is further also possible that the folding tool or the rotary body is actively returned or displaced back from a forming position into the initial position by means of a drive. In this case, the drive is part of an active return means.

It can be provided that the folding tool is displaced by a common drive from the initial position into the forming position and is returned or displaced back from the forming position into the initial position.

It can also be provided that the folding tool is displaced from the initial position into the forming position and is returned or displaced back from the forming position into the initial position by separate drives.

The drive can be a pneumatic drive, for example, and can include a pneumatic cylinder, for example. The drive can be a hydraulic drive and can include a hydraulic cylinder, for example. The drive can be an electric drive. The electric drive can include a linear motor.

For a folding tool rotatable or pivotable about a geometric axis of rotation, the folding aid can be implemented so that a dead center point is implemented when pivoting the folding tool toward the corner zone, at which the folding tool implements a maximum press force on the blank in the direction of the corner zone, wherein the press force drops off again when the folding tool pivots onward.

The rotary body can include a co-rotating rotary element for implementing the dead center point through which the axis of rotation leads. The rotary element implements a force transfer contact together with a particularly stationary guide element. The rotary element implements a contact region along the circumference thereof, at which a maximum radial distance to the outer circumference of the rotary element from the axis of rotation is present, and at which the guide element correspondingly exerts a maximum compressive force on the rotary element and on the folding tool by means thereof. The contact region forms a dead center point together with the guide element, in that the radial distance to the outer circumference of the rotary element from the axis of rotation and thus the compressive force on the rotary element drops off again before and after the contact region in each case.

The guide element, not part of the rotary body, is disposed relative to the rotary element such that the associated force vector does not lead through the axis of rotation F.

The rotary element can have the cross-sectional shape of an equilateral triangle, for example.

The invention according to the first aspect further includes a method for setting up containers from flat blanks. The method includes the following steps:

introducing the blank, particularly being held, into the forming station and positioning the blank in a forming position;

displacing the forming punch toward the blank in the forming direction;

pressing the blank into the setup space of the backing device and folding and forming the blank, and particularly the functional edge, by the forming punch, and fully setting up the container from the blank.

The method is characterized in that the folding tool of the at least one folding aid is brought together with the at least one flange segment during forming, that is, setting up of the container, and the folding tool acts on the blank and interacts with the at least one flange segment such that a functional edge offset laterally outward is folded out of the blank. The folded functional edge particularly contacts the flange segment or the inner wall segment of the flange segment.

According to a refinement of the method, the at least one folding aid acts together with the folding tool on the corner zone implemented between the at least one punch side and the at least one flange segment during setting up of the container.

The folding tool thereby presses the fold line formed between the container side wall and the functional edge into the corner zone, whereby folding of the functional edge takes place. The folding procedure brings about bending between the functional edge and the associated container side wall.

The folding tool and flange segment can be brought together in that the folding tool is displaced toward the flange segment. The folding tool and flange segment can particularly be brought together in that both the flange segment and the folding tool are displaced toward each other.

The folding tool and flange segment can also be brought together in that the flange segment is displaced toward the particularly non-displaced folding tool.

The rotary motion of the rotary body can be particularly initiated by the advancing of the forming punch in the forming direction.

This is particularly the case when the folding tool is implemented as a rotary body together with a stop element. To this end, the forming punch, in particularly the punch end face of the forming punch strikes the stop element and sets the same in motion, particularly in a pivot motion. The stop element and thus the folding tool is consequently caused to rotate by the forming punch.

The folding tool is displaced into the motion zone of the forming punch from the side during the forming and is displaced, particularly pivoted, toward the same. As the motion progresses, the folding tool increasingly engages in the corner zone between the punch side and the flange segment. Furthermore, as the motion of the folding tool progresses, the force exerted by the folding tool on the corner zone increases until a dead center point at which there is a maximum applied force is reached.

After the dead center point is passed, the force exerted on the corner zone drops off again due to progressing motion, particularly rotary motion, of the folding tool, and the folding tool is displaced out of the motion zone of the forming punch again, particularly pivoted out. This allows the removing of the set-up and particularly also glued container from the forming punch after the setup procedure.

When the folding tool is pivoted, the pivot direction remains unchanged even after passing the dead center point.

The forming punch is displaced back into the initial position thereof opposite the forming direction by means of the return stroke.

The folding tool is furthermore also displaced back or pivoted back into the initial position thereof by means of the returning means, for example.

According to a particular embodiment of the device, as applied according to the first and the second aspect of the invention, described below, the device includes at least one flange stop disposed ahead of the stack guide of the discharging device in the process direction, particularly at least one pair of flange stops particularly disposed parallel to each other and spaced apart from each other.

The at least one flange stop can be implemented as a flange stop strip or can include the same. The at least one flange stop can include an angle profile, wherein the flange stop strip is implemented by a profile flank.

The flange stop can include a flange stop strip extending over the entire flange segment. The flange stop can include a plurality of flange stop strip segments extending along the flange segment.

The flange stop can be disposed on a support.

The at least one flange stop or the at least one pair of flange stops form a stop for a functional edge or for two functional edges running parallel to each other and spaced apart from each other and laterally delimiting the container receptacle.

That is, the functional edge or the two functional edges of the set-up container strike the flange stop or the flange stops when the container is pushed in the process direction or forming direction.

The flange stop or the flange stops therefore form a limit for pushing in the set-up container.

The flange stop or the flange stops particularly serve as a backing device for the forming punch. The flange segments of the forming punch thus press the functional edges against the flange stop or the flange stops during or after setting up the container.

Adhesive connections in the overlap region of the functional edges are completed by the press force. To this end, the forming punch and flange stop or flange stops can remain temporarily, that is, briefly, in a clamping or pressing position when the stack forming position is reached. This allows at least partial curing or bonding of the adhesive before the set-up container is transferred to the stack guide of the discharging device, for example.

The set-up container is particularly pushed into the stack guide by the forming punch. According to the current but not solely conceivable embodiment, the set-up containers are pushed, having the container base facing forward, into the container furthest back of a container stack formed in the stack guide.

The at least one flange stop can be disposed on a container receiver disposed between the backing device and the discharging device in the process direction or forming direction.

The container receiver having the flange stop can be disposed between the backing device and the discharging device in the process or forming direction, as described above.

The container receiver having the flange stop can also, however, be part of the discharging device. The container receiver having the flange stop can also be part of the backing device. This is particularly the case if no turning device is provided.

The flange stops of the at least one pair of stops are displaceable particularly relative to each other, such that the distance between the pair of flange stops can be modified. The flange stops are particularly linearly displaceable relative to each other.

The particularly linear displaceability is particularly in a plane perpendicular to the working axis or forming direction.

The size of the container receptacle space can thereby be adjusted, for example.

The flange stops can further be displaced transverse to the working axis relative to each other particularly between a stop position and a release position.

In the stop position, the set-up container can be pushed in between the two flange stops only until the functional edges stop against the flange stops. That is, the distance between the inner edges of the two flange stops is less than the distance between the outer edges of the functional edges.

In the release position, the flange stops and the functional edges of the set-up container can be displaced past each other along the working axis. That is, the distance between the inner edges of the two flange stops is equal to or greater than the distance between the outer edges of the functional edges.

The drive for particularly linearly displacing the flange stops relative to each other or for modifying the distance between the pairs of flange stops can be a:

pneumatic drive, particularly having a pneumatic cylinder;

hydraulic drive, particularly having a hydraulic cylinder; or an electric drive, particularly having a linear motor.

The flange stops can each be displaceable by means of a slide guide. The slide guide particularly includes a guide slide and a guide rail.

The flange stops can thus be displaceable transverse to the working axis by means of a slide guide on a common support structure.

The support structure and the slide guide can be part of the container receiver.

The flange stops are further displaceable particularly also along the working axis. The flange stops are particularly jointly displaceable along the working axis.

The flange stops can thus be displaced from an initial position into a stacking position in the process direction or forming direction. The displacing takes place particularly by means of the entraining force of the forming punch displaced in the process direction or forming direction.

It is thereby ensured that the flange segment of the forming punch does not strike the flange stops abruptly. The forming punch, rather, entrains the flange stops along a limited path during the setup procedure. The stopping of the flange segments against the flange stop is thereby damped. Damping means can in turn be associated with the flange stops for damping the motion induced in the forming direction by the entrainment force of the forming punch. The damping means can be pneumatic cylinders or hydraulic cylinders. The cylinders can be part of a pneumatic drive or a hydraulic drive.

The flange stops are further displaceable back or returnable from the stacking position into the initial position opposite the process direction or forming direction. The particularly linear displacing particularly takes place by means of a drive.

The drive for particularly linearly displacing the flange stops along the working axis can be a:

pneumatic drive, particularly having a pneumatic cylinder;

hydraulic drive, particularly having a hydraulic cylinder; or an electric drive, particularly having a linear motor.

The flange stops can be displaceable along the working axis by means of a slide guide.

The flange stops are particularly displaceable along the working axis by means of a common slide guide and a common drive. The slide guide particularly includes a guide slide and a guide rail. A support structure having the flange stops disposed thereon can thus be displaceable by means of a slide guide having a drive.

The support structure and the slide guide or parts thereof can be part of the container receiver.

The displaceability of the flange stops relative to each other transverse to the working axis between a stop position and a release position, in combination with the displaceability of the flange stops along the working axis between an initial position and a stacking position, allows a stack of set-up and particularly glued containers, pushed into each other, to be implemented in the discharging device.

To this end, the flange stops can be displaced past the at least one functional edge of the set-up container when displacing along the working axis from the stacking position in the release position.

The flange stops are disposed ahead of the functional edges between the initial position and the stacking position as seen along the working axis in the process direction or forming direction during the forming or setting up of the container.

The flange stops are particularly vertically oriented in the forming station.

If the forming punch includes two short punch sides opposite each other and two long punch sides opposite each other for setting up containers having a rectangular container base having two long container sides and two short container sides, then the flange stops are disposed particularly parallel to the long punch sides.

According to a particular refinement of the above embodiment having at least one flange stop, at least one flange stop, particularly the flange stops of at least one flange stop pair, implements one folding tool each according to the invention for interacting with the flange segment of the forming punch such that a laterally outwardly protruding functional edge is folded from the blank when setting up the container.

The flange stop or flange stops act particularly in a corner zone implemented between the at least one punch side and the flange segment during the forming or setting up of the container.

The flange stop or flange stops can be displaced toward the flange segment of the forming punch during the forming of the functional edges of the container. It is also possible, however, that the flange stop or flange stops are stationary during the forming of the functional edges of the container and only the forming punch is displaced toward the flange stop or the flange stops.

It is conceivable that the device according to the invention includes two pairs of flange stops each opposite each other for interacting with the flange segments of the forming punch. The flange stops particularly implement a closed frame in the initial position thereof in the stop position. The flange stops can have the functionality described above. The flange stops according to the present refinement can each implement a folding tool as described further above.

It is further conceivable that the device includes both at least one folding aid having a folding tool in the form of a flange stop, as described above, and at least one folding aid having a pivotable folding tool, also as described further above.

The device can thus include two flange stops implemented as folding aids, particularly flange stops opposite each other, for interacting with two first flange segments, particularly opposite each other. The device can further include two folding aids, each including a pivotable folding tool, particularly opposite each other, for interacting with two second flange segments, particularly opposite each other. The pivotable folding tools are particularly supported rotatably or pivotably about a geometric axis of rotation.

According to a potential embodiment of the method for setting up a container along fold lines from a flat blank, the forming punch is displaced toward the blank in the forming direction, wherein the blank is displaced by the forming punch into the setup space of the backing device.

The forming punch, together with the at least one flange segment, is displaced toward the flange stop and is brought together with the same. The functional edge formed by the folding tool is thereby clamped or pressed between the flange segment and the flange stop.

If the at least one flange stop is implemented as a folding aid having a folding tool, then the flange stop interacts with the at least one flange segment such that a laterally outwardly protruding functional edge is formed from the blank.

The forming punch pushes the container set up in the backing device further in the process direction or forming direction into the stack guide of the discharging device while clamping the at least one functional edge together with the at least one flange stop being carried along.

The motion or carrying of the at least one flange stop in the process direction or forming direction can be damped.

The clamping or pressing of the at least one folding edge between the at least one flange segment and the at least one flange stop can be maintained for a defined time once the stack forming position is reached for establishing the adhesive connection. This is particularly applicable to corner segments of two functional edges meeting at an angle and overlapping in the folded state for being connected to each other by means of an adhesive connection.

The at least one flange stop is disposed ahead of the at least one functional edge as seen in the process direction or forming direction.

For releasing the set-up container and for returning the at least one flange stop from the stacking position into the initial position, the flange stop is displaced transverse to the process direction or forming direction from the stop position into the release position. As a result, the at least one flange stop is returned to the initial position opposite the process direction or forming direction and past the functional edges of the set-up container, as well as transverse to the process direction or forming direction into the stop position.

According to a second aspect of the invention, the generic device for setting up containers from flat blanks includes a forming station having a forming tool. The forming tool includes a displaceable forming punch and a backing device for setting up the containers from the blanks. The device further includes a discharging device having a stack guide for forming a stack of set-up containers nesting in each other.

The device is characterized in that a turning device for turning the set-up container is disposed between the forming station and the discharging device, wherein the turning device is designed for modifying the orientation of the container opening such that the set-up containers can be pushed over a preceding container for forming a stack of containers pushed over one another, each having the container opening thereof facing forward.

This is in contrast to pushing the containers into each other, wherein the containers each are pushed into the container receptacle of a preceding container having the base thereof facing forward.

According to a refinement of the invention, the turning device includes a turning body rotatable about an axis of rotation. The turning body is particularly driven about the axis of rotation by means of a drive. The axis of rotation is particularly disposed perpendicular to the working axis or the forming direction.

The turning body particularly includes at least one container receiver designed for receiving the set-up and particularly glued container from the forming punch and holding the same. The container receiver is particularly designed as a counter form.

The at least one container receiver particularly forms at least one and most particularly a plurality of stop strips against which one functional edge each of the set-up container stops or strikes when the container is pushed into the container receiver.

The at least one stop strip therefore implements a limit for pushing in the set-up container.

According to a refinement, the container receiver implements a pair of stop strips disposed parallel to each other and spaced apart from each other. The pair of stop strips form a stop for two functional edges running parallel to each other and spaced apart from each other and laterally delimiting the container receptacle.

According to a refinement, the stop strips form a circumferential or closed frame enclosing a container receptacle space in which the set-up container can be pushed by the forming punch after the setting-up procedure.

The stop strips or the frame can be a single part. The stop strips or the frame can be multipart in design. The stop strips can thereby be displaceable relative to each other. This allows adapting the container receiver and the container receptacle space to different sizes and shapes of containers.

That is, the size of the frame or the size of the container receptacle space can be adjustable, that is, scalable.

Furthermore, the stop strips or the frame can also be displaceable along the working axis for adjusting the functional position thereof.

The stop strips can be flange stop strips as described above. The flange stop strips can accordingly include the (displacing) functionality described above and the structural features indicated.

According to a refinement of the invention, the turning body includes at least one ejector designed for ejecting the containers held by the container receiver into a stack guide of the discharging device.

According to a refinement of the invention, the turning body includes at least two container receivers disposed opposite each other, that is, at an angle of 180° (angular degrees) about the axis of rotation.

The turning body can be rotated by 180° in a working cycle, for example, wherein one first container receiver faces toward the forming punch for receiving a set-up punch each time, and a second container receiver faces toward the discharging device for transferring a set-up container.

According to a refinement of the invention, the forming direction of the forming punch and the ejecting direction of the ejector face in the same direction. That is, the forming direction of the forming punch corresponds to the ejecting direction of the ejector. The ejector can be implemented such that the ejector interacts with the forming punch such that the ejecting stroke of the ejector is initiated by the forming stroke of the forming punch. To this end, the ejector implements a first contact region by means of which the forming punch pushes away the ejector in the forming direction during the forming procedure, for example by means of the end face thereof. A second contact region of the ejector ejects the set-up container into the stack guide during the motion.

The ejector is therefore passively driven by means of the forming punch.

The length of the ejector can thereby be adjusted. This can be achieved by a telescoping ejector, for example. Therefore, the optimal ejecting length can be adjusted depending on the container size and depth.

The ejector can further interact with damping elements, such as shock absorbers, for damping the ejecting motion and thus ensuring more gentle ejecting of the set-up containers.

According to a refinement of the invention, it can also be provided that the turning body includes four container receivers each disposed at an angle of 90° (angular degrees) about the axis of rotation. In this case, the turning body is rotated by 90° each time during a working cycle.

One ejector can be associated with a pair of two container receivers opposite each other, that is, disposed at an angle of 180° (angular degrees) about the axis of rotation. The ejector can be implemented as described above and can be passively driven by the forming punch in each case.

It is also possible, however, that the ejector is actively driven by a drive.

The invention according to the second aspect also includes a method for setting up containers from flat blanks and for discharging the formed containers into a stack of nested containers. The method includes the following steps:

- introducing in the blank, particularly being held, into the forming station and positioning the blank in a forming position;
- displacing the forming punch toward the blank in the forming direction;
- pressing the blank into the setup space of the backing device and
- folding and forming the blank, and particularly the functional edge, by the forming punch, and
- fully setting up the container from the flat blank.

The method is characterized in that the set-up containers are received by the turning device and turned, wherein the orientation of the container opening is modified, and after the turning the set-up containers, and in particular glued containers, are pushed over a preceding container by means of the ejector in the discharging device for forming a stack of containers pushed over each other, each having the container opening thereof facing forward.

When transferring the set-up container to the turning device, the set-up container is particularly pushed into the container receiver by the forming punch. The functional edge of the set-up container is thereby pressed against the stop strips of the container receiver by the flange segments of the forming punch.

Adhesive connections in the overlap region of the functional edges are completed by the press force. To this end, the forming punch and stop strips can temporarily, that is, briefly, remain in the clamping position or pressing position. This allows the at least partial curing or bonding of the adhesive before the forming punch is retracted again.

The set-up container remains in the container receiver after the forming punch has been retracted.

The container held in the container receiver is then rotated by the turning device.

According to a refinement of the invention, the set-up container is rotated 180° in the turning device from the set-up position thereof, so that the container opening in the ejecting position of the container is oriented in the opposite direction relative to the forming and setting-up position of the container in the forming station.

The turning device according to the invention therefore allows the forming of a stack of containers pushed over each other, wherein the container is pushed over the rearmost container in the stack having the container opening facing forward.

In contrast to stacking according to a conventional method, as described further above, the stacking according to the invention of containers nested in each other has the advantage that the pushing direction of the container runs opposite the folding direction of the functional edge, so that the functional edge cannot return to the initial position thereof during stacking. The functional edge is rather stabilized in the laterally protruding position thereof by stacking.

As previously mentioned, the set-up containers are displaced or ejected out of the container receiver into the container receptacle of the stack guide of the discharging device after turning. This is done particularly by means of an ejector, mentioned further above, such as a ram ejecting toward the stack guide.

The containers nested in the stack formation in the stack guide can be removed from the stack guide, for example by operators, and packed in cardboard boxes in the stack formation, for example.

The present device and the associated method according to the first aspect of the invention allows producing and setting up of containers, particularly shells, having a functional edge running transverse to the transport direction of the blank, and very particularly the forming of a circumferential functional edge about the container opening. The present device and the associated method according to the second aspect of the invention further allows forming a stack of nested containers having functional edges, without the functional edge being compromised when forming the stack.

The first and second aspect of the invention complement each other, of course, for an overarching, uniform concept of the invention. Features of the first aspect of the invention can accordingly be combined with features of the second aspect of the invention.

BRIEF DESCRIPTION OF THE DRAWINGS

The object of the invention is explained in further detail below using embodiment examples shown in the attached drawings. They show, schematically in each case.

DETAILED DESCRIPTION OF THE INVENTION

Figure 1A:
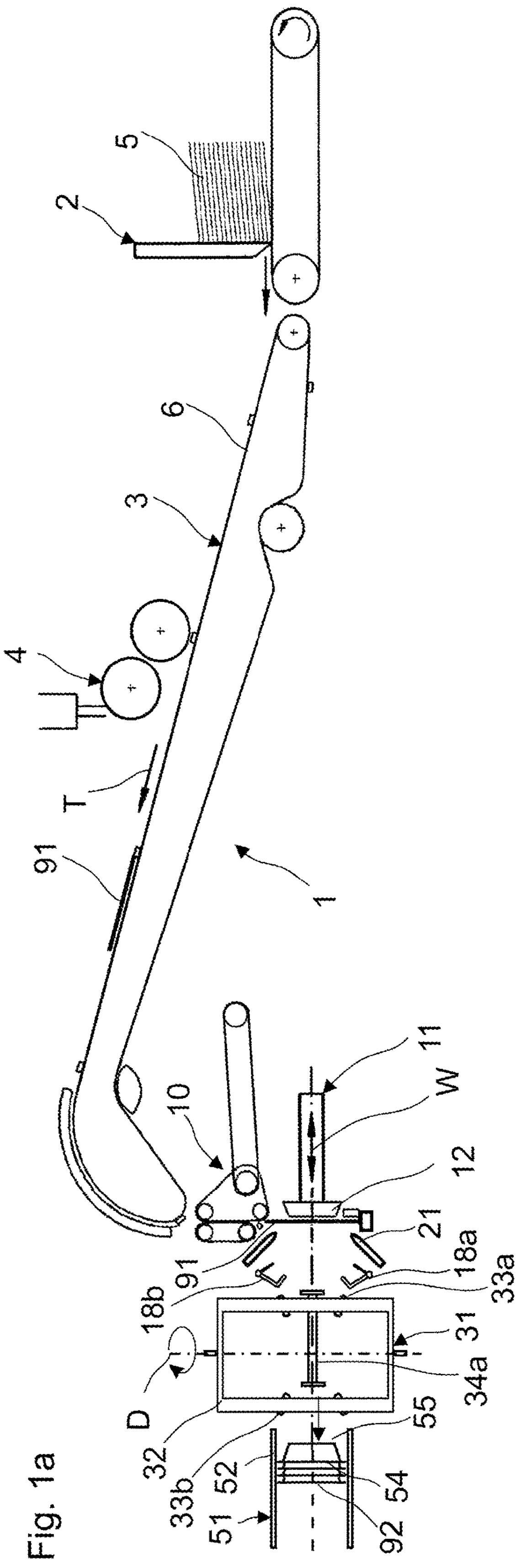
FIG. 1*a* a side view of a device according to the invention for setting up containers from flat blanks having a turning device.

Identical parts in the figures are fundamentally referenced with the same reference numeral. Some features, such as features not essential to the invention, are not shown in the figures in order to clarify the invention. The embodiment examples described are examples representing the object of the invention or serve for explaining the object, and have no limiting effect.

Figure 1B:
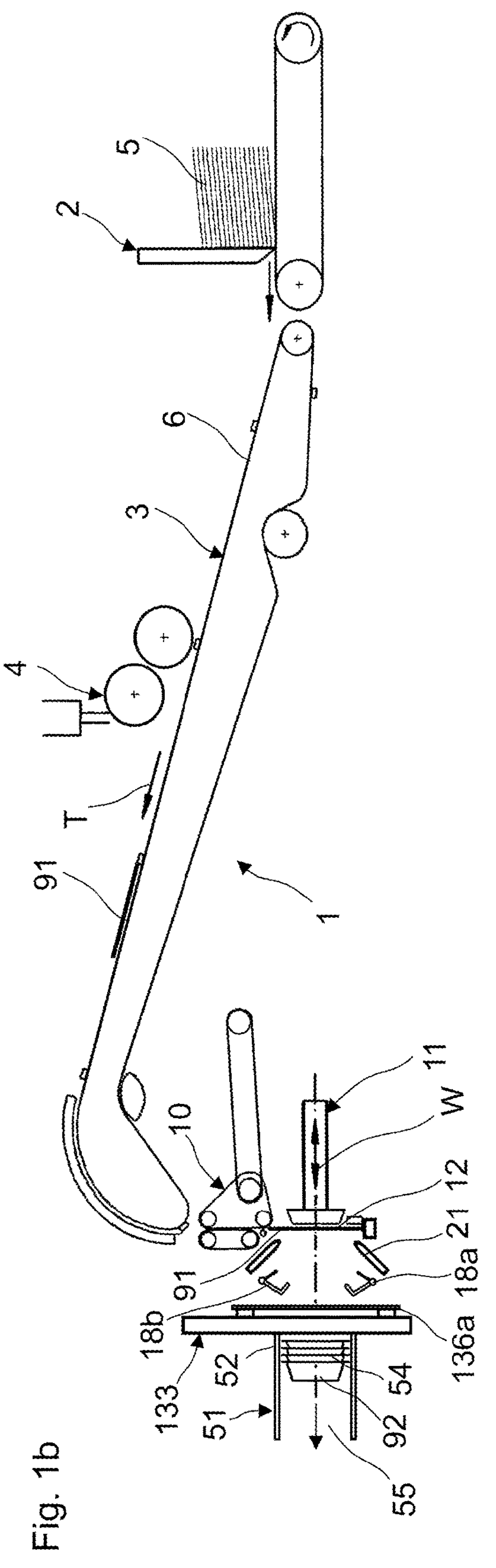
FIG. 1*b* a side view of a device according to the invention for setting up containers from flat blanks without a turning device.
Figure 8A:
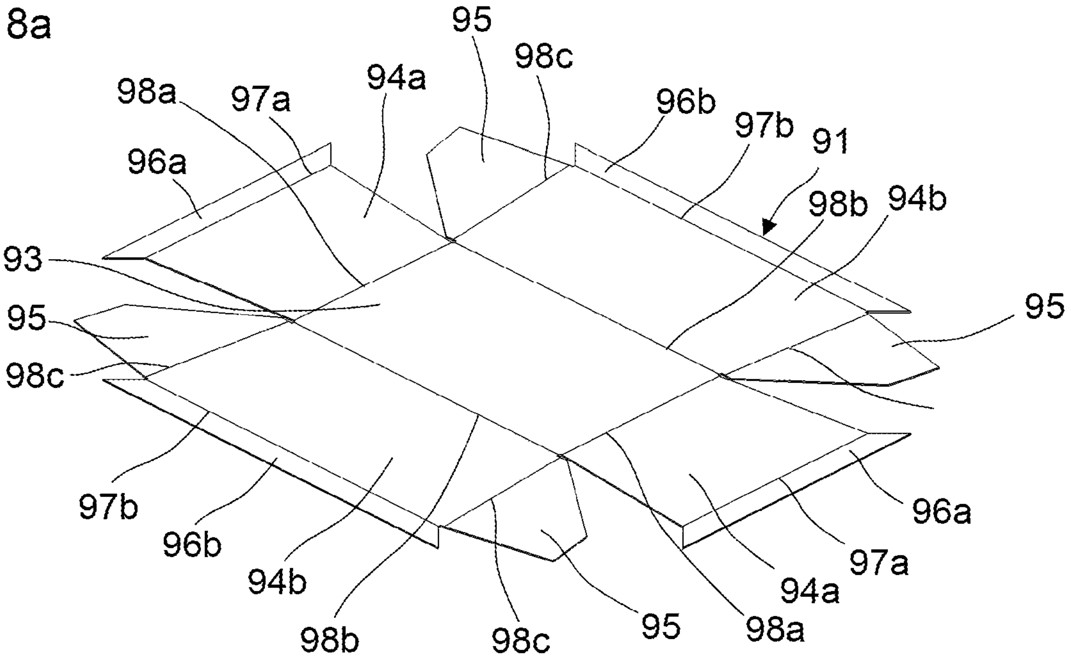
FIG. 8*a* a flat blank.

FIGS. 1*a* and 1*b* in each case show an embodiment of a device 1 according to the invention for setting up of container 92 from flat blanks 91, as they are also shown in FIG. 8*a* (flat blank 91) and 8*b* (set up container 92).

The device 1 includes a feeder 2 for providing the blanks 91 as a stack 5 as seen in the process direction. The blanks 91 are individually taken off the stack 5 and transferred to a transport device 3 downstream of the feeder 2, by means of which the blanks 91 are transported to a forming station 10. Transporting the blanks 91 can be done by means of a chain or belt drive. The blanks 91 can be transported by means of drivers or clips, for example.

In the present embodiment, the blanks 91 are transported in the transport direction T along a transport plane 6 inclined diagonally upward in the direction of the forming station 10 and are deflected vertically downward by a deflecting device prior to the forming station 10, so that the blanks 91 are transported into the forming region of the forming station 10 in a vertical orientation.

The transport plane 6 can in principle also be horizontal or inclined diagonally downward. The transporting of the blanks 91 also need not run along a transport plane. The transport path can also follow a curved track.

An adhesive applying station 4 for applying adhesive to defined adhesive regions on the blank 91 is disposed between the feeder 2 and the forming station 10. The adhesive regions can be adhesive dots, for example, particularly applied to adhesive tabs 95 (see also FIG. 8*a*). The adhesive applying station 4, however, is not a mandatory feature of the present invention. The adhesive applying station can also be integrated in the forming station.

A folding station (not shown) can furthermore be disposed between the feeder 2 and the forming station 10, in which a fold is introduced in the connecting segment between a container cover and a container base body having a container receptacle, for example. The folding station can also serve for introducing a fold running in the transport direction T between a container side wall and a functional edge.

The flat blank 91 is fed into the forming station 10 downstream of the transport device 3 vertically or diagonally from above and is positioned in the forming region in a forming position. The forming station 10 includes a forming tool 11 having a forming punch 12 and a backing device 21 implementing a setup space 24. The flat blank 91 is set up and glued by means of the forming tool 11 to form a container 92 having a container receptacle 100 and a container opening 99.

The forming punch 12 and the backing device 21 implement a type of male/female tool and die system to this end. The forming punch 12 performs an in particular linear forming stroke along a working axis W in the forming direction U toward the flat blank 91 for setting up the container 92. The forming punch 12 thereby presses the flat blank 91 into the setup space 24 of the backing device 21, whereby the flat blank 91 is set up to form a container 92. When setting up, side wall parts 94*a*, 94*b* of the flat blank 91 are bent along predefined fold lines 98*a*, 98*b* relative to a base part 93.

The backing device 21, for example implemented by a linkage, is only indicated in FIGS. 1*a*, 1*b*, 3, and 5 for reasons of clarity. The implementing of the backing device 21 is not, however, an essential aspect of the invention. A backing device is also disclosed in DE 102 48 231 A1, disclosing a generic device for setting up containers from flat blanks. In the cited publication, the forming elements 51 shown in FIG. 2 implement the backing device.

The forming stroke of the forming punch 12 runs horizontally according to the two embodiments. The forming stroke can, however, also run diagonally upward or diagonally downward at an angle to the horizontal. It is much more important, however, that the forming stroke and the associated working axis W runs perpendicular to the plane in which the flat blank 91 is disposed in the forming position.

The exact sequence of the forming procedure and particularly the forming of the functional edges 96*a*, 96*b* according to the first aspect of the invention is described in more detail below using the FIGS. 2 through 6 and 9*a* through 9*c*.

Figure 2:
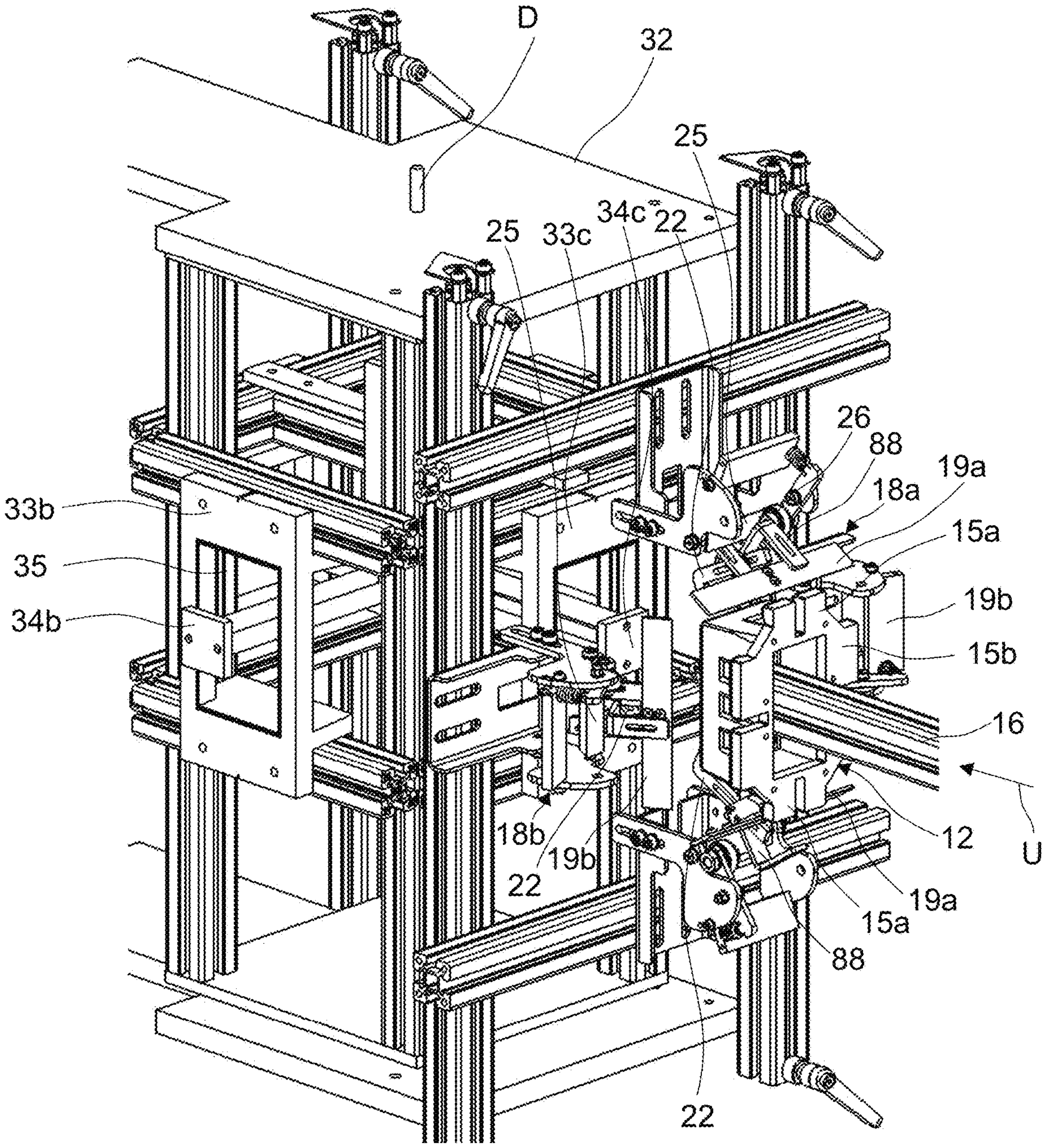
FIG. 2 a perspective view of a part of the forming station according to the invention and the turning device.
Figure 3:
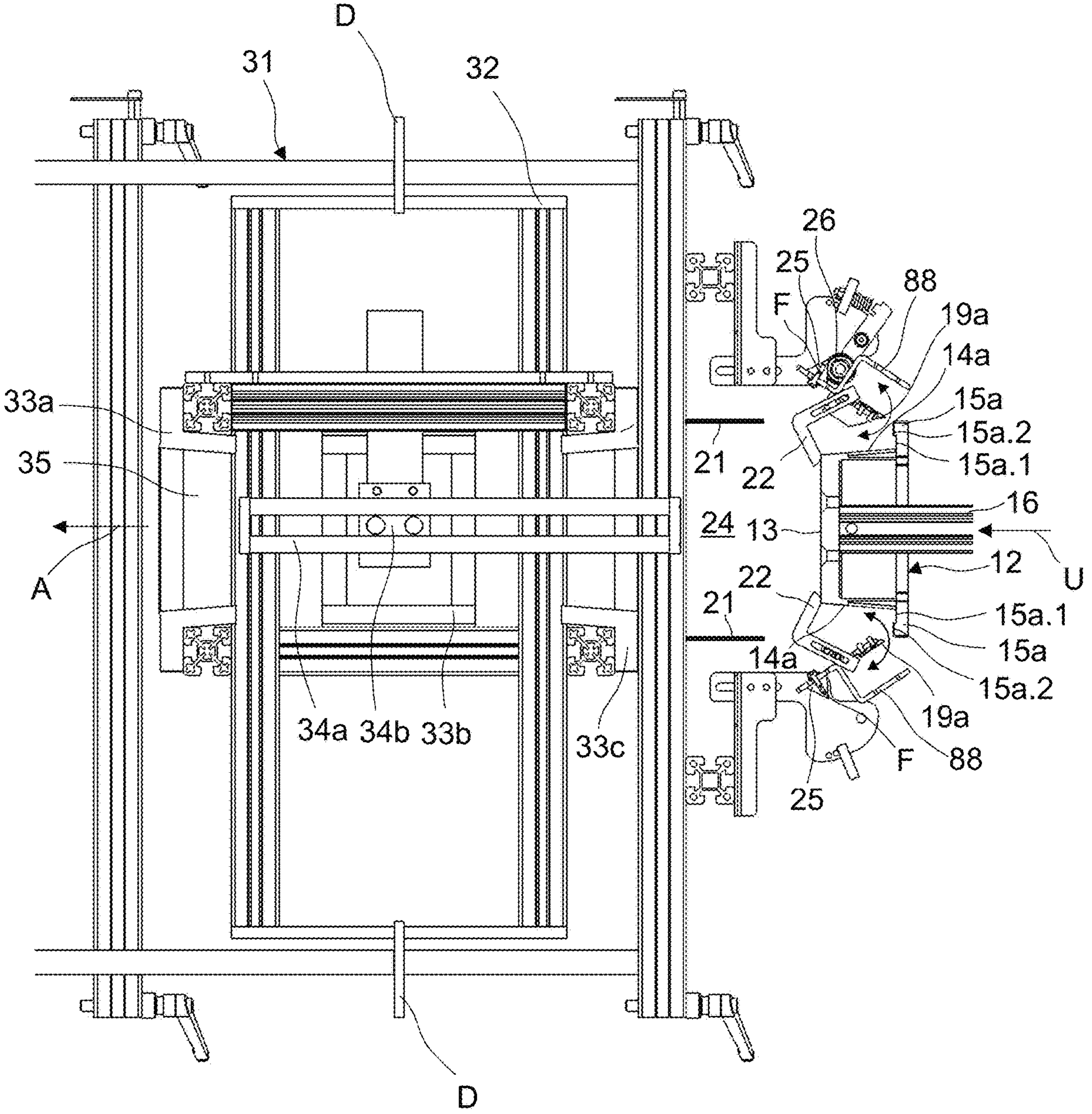
FIG. 3 a side view of a part of the forming station and the turning device according to FIG. 2.
Figure 4:
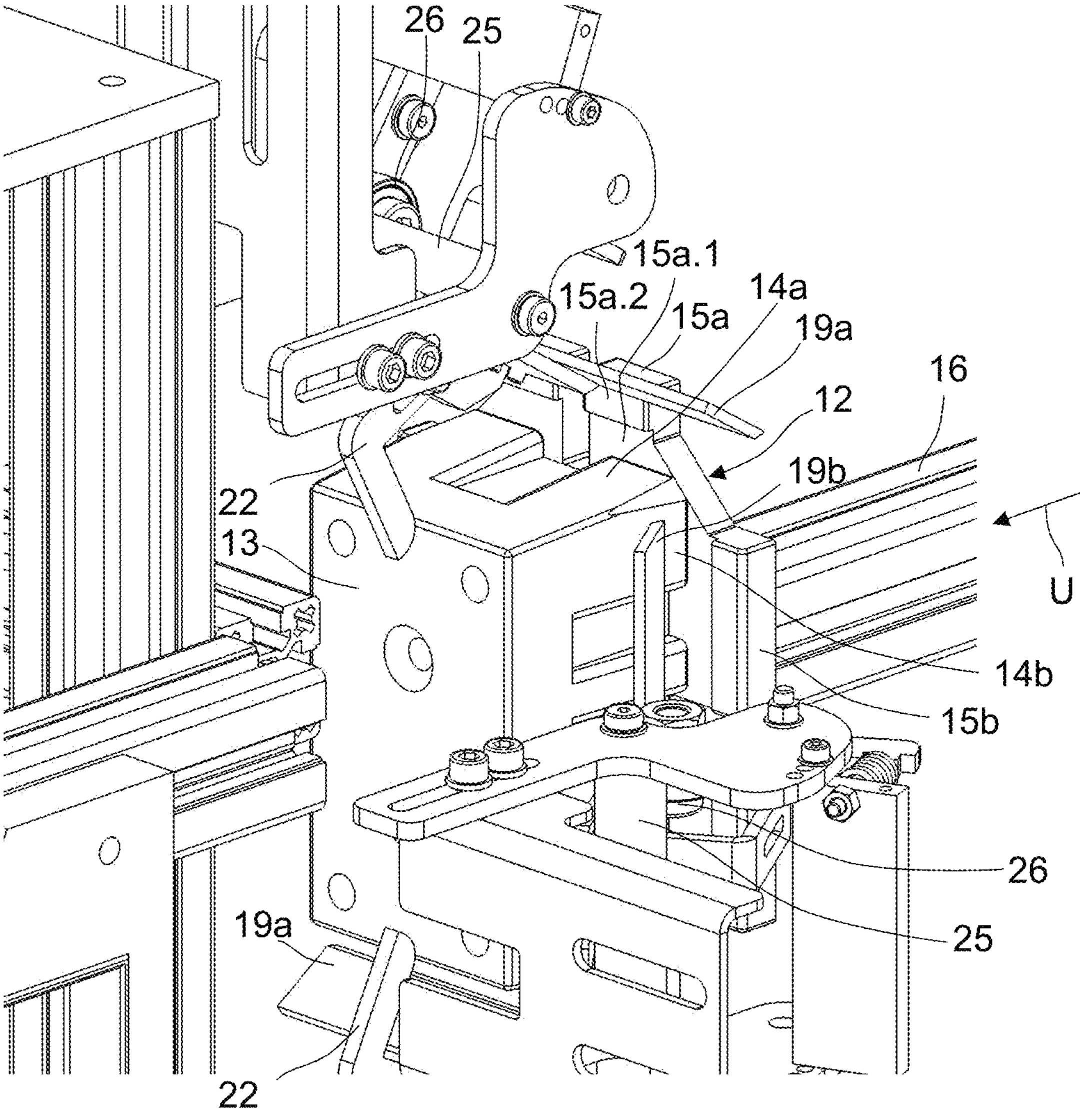
FIG. 4 a perspective view of a part of the forming station according to FIG. 2.
Figure 5:
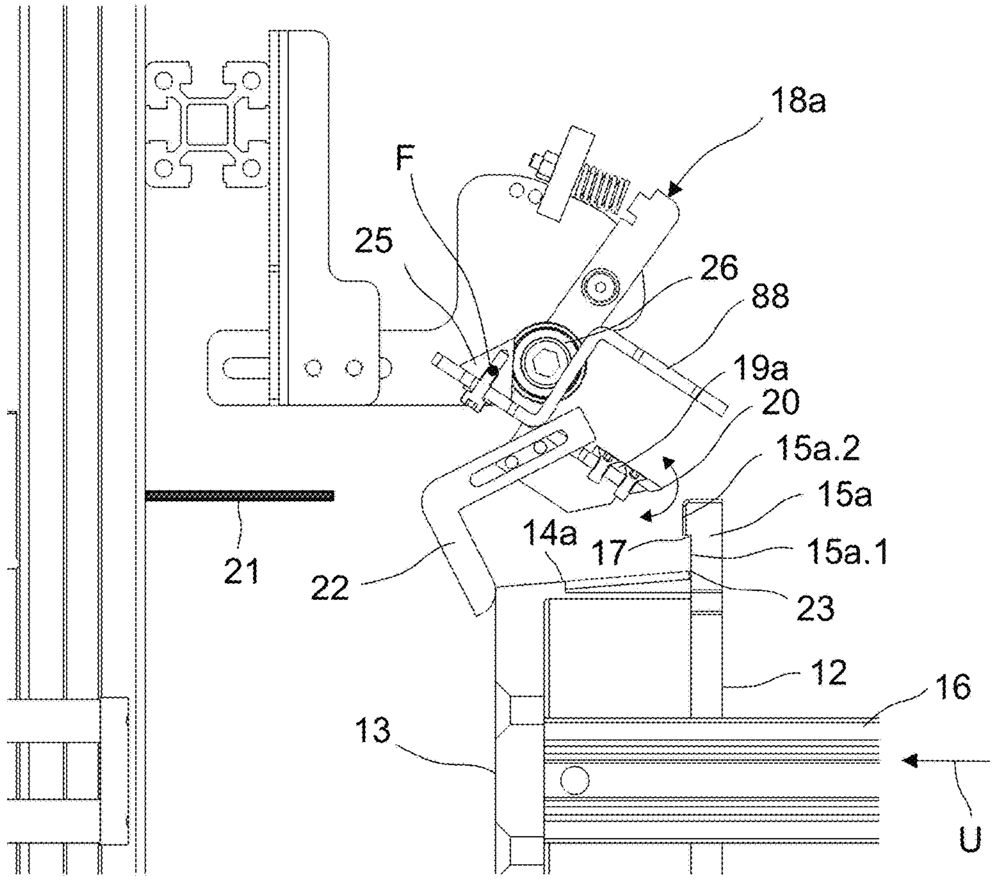
FIG. 5 a side view of a detail of the forming station according to FIG. 2.
Figure 7:
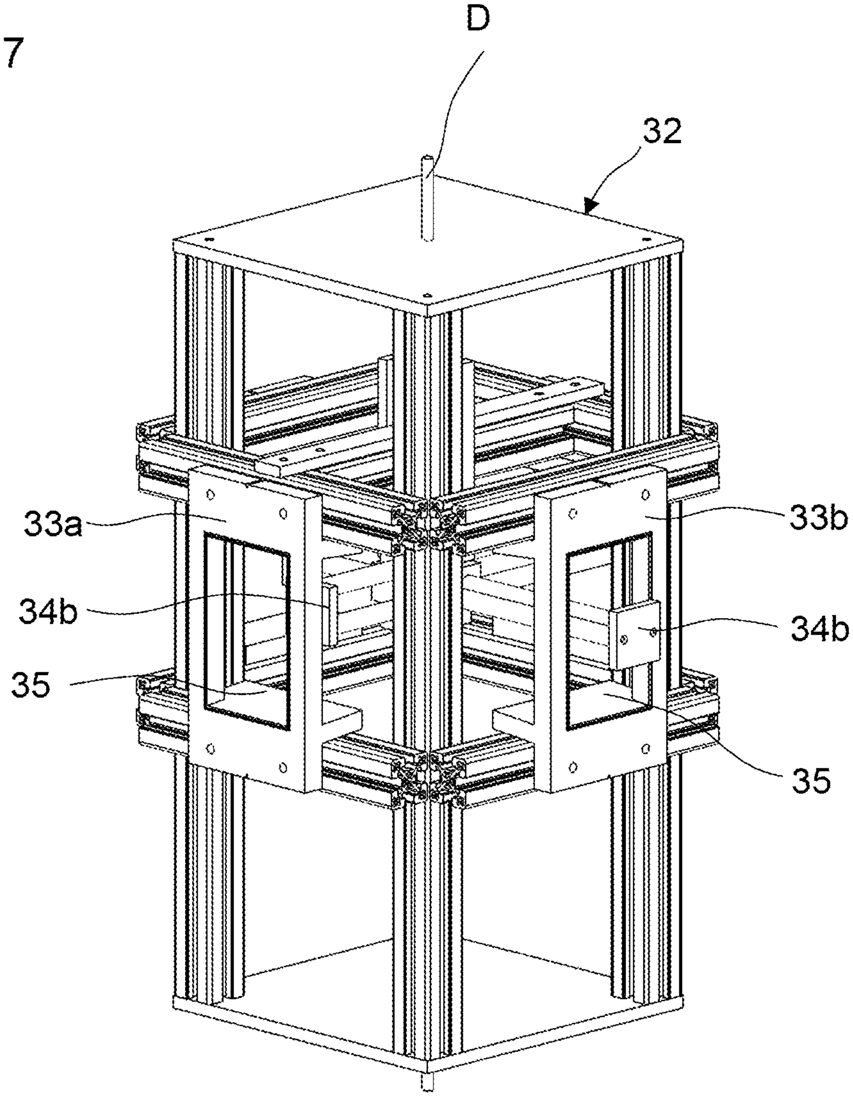
FIG. 7 a perspective view of the turning device according to the invention.

The embodiment according to FIG. 1*a* is thus characterized in that the set-up container 92 is transferred to the container receiver 33*a*, 33*b*, 33*c* of a turning device 31 after the forming procedure, as is shown in FIGS. 2, 3, and 7. The turning device 31 is disposed after the forming station 10 and before a discharging device 51 in the process direction.

The set-up containers 92 are rotated by 180° (angular degrees) in the turning device 31 and then ejected into the container receiving space 55 of a stack guide 52 of the discharging device 51 having the container opening 99 facing forward. The ejected containers 92 are pushed over each other in the stack guide 52 for forming a container stack 54.

Figure 10A:
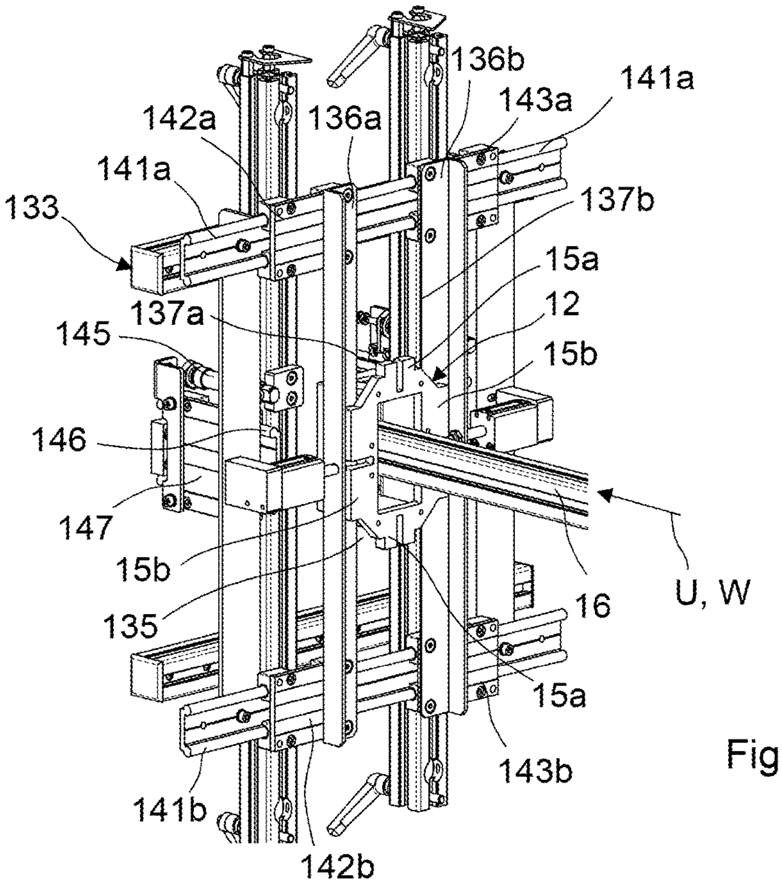
FIG. 10*a* a perspective view of a particular embodiment of a container receiver.
Figure 10B:
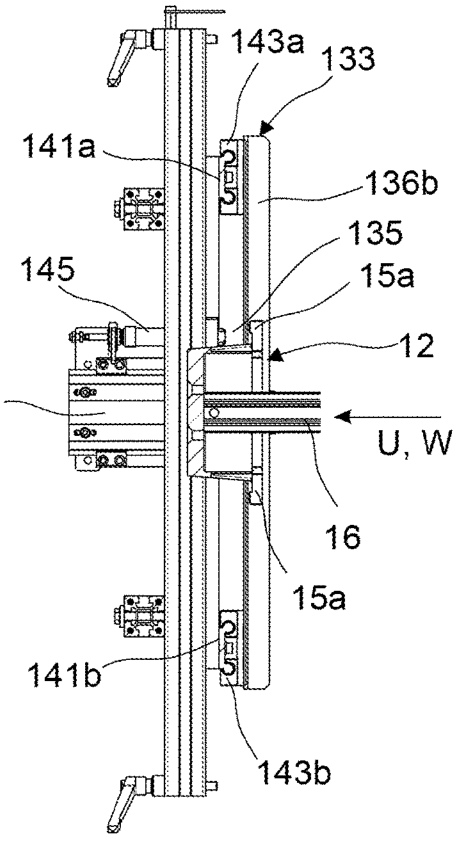
FIG. 10*b* a side view of the container receiver according to FIG. 10*a*.

The embodiment according to FIG. 1*b* is thus characterized in that the set-up container 92 is pushed into a container receiver 133 by the forming punch 12 after the forming procedure, as is shown in FIGS. 10*a* and 10*b*. The container receiver 133 is disposed after the forming station 10 and before a discharging device 51 in the process direction.

The set-up containers 92 are ejected into the container receiving space 55 of a stack guide 52 of the discharging device 51 by the forming punch 12 by means of the container receiver 133 having the container base 93 facing forward. The ejected containers 92 are pushed into each other in the stack guide 52 for forming a container stack 54.

The stacked containers 92 can then be removed from the stack guide 52 in groups according to the two embodiments according to FIGS. 1*a* and 1*b*, for example packaged in stacks in boxes and delivered.

The handling of the set-up containers 92 after the forming station 10 is described in more detail below using detail views.

The flat blank 91, as shown in FIG. 8*a*, includes a base part 93 for subsequently implementing the container base 93. The blank 91 further includes first side wall parts 94*a* for subsequently implementing the first side walls 94*a* of the container 92 and second side wall parts 94*b* for subsequently implementing the second side walls 94*b* of the container 92. The side wall parts 94*a*, 94*b* are each connected to the base part 93 by means of predefined fold lines 98*a*, 98*b*.

An adhesive tab 95 is disposed in each case on the side of the second side wall parts 94*b*, serving for connecting adjacent side walls 94*a*, 94*b* by means of adhesive connections. The adhesive tabs 95 are also connected to the second wall parts 94*b* by means of predefined fold lines 98*c*.

Figure 8B:
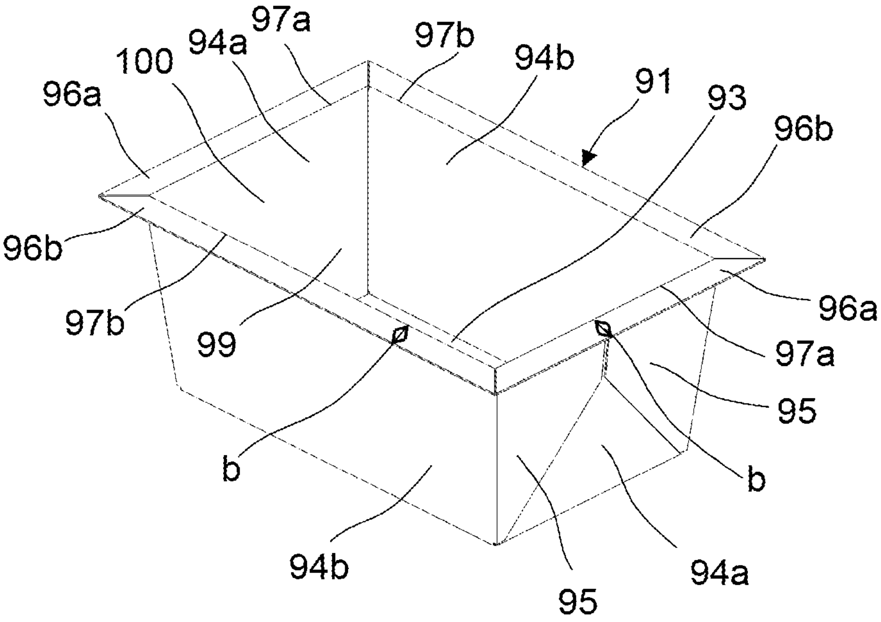
FIG. 8*b* a container set up from the flat blank according to 8a and glued.
Figure 9A:
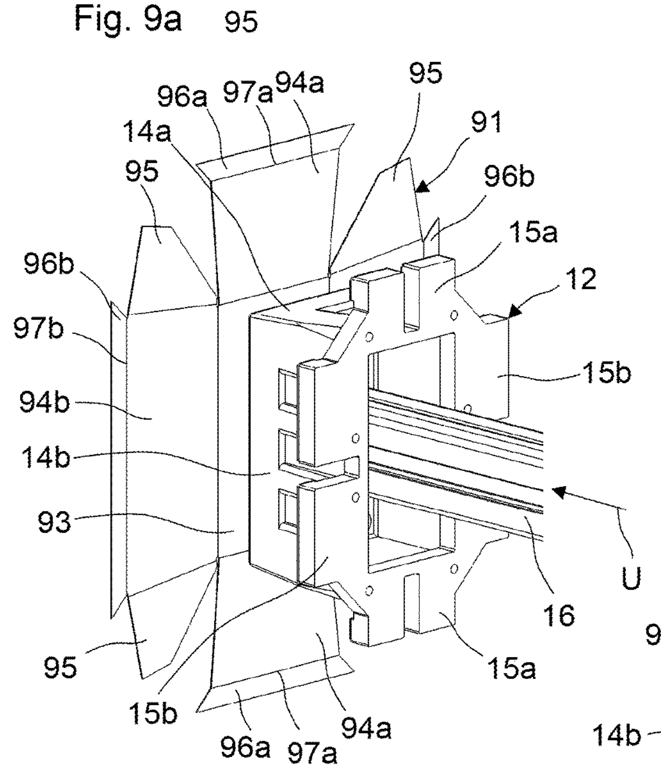
FIG. 9*a*-9*c* perspective views of various forming stages during the setting up of a container.
Figure 9B:
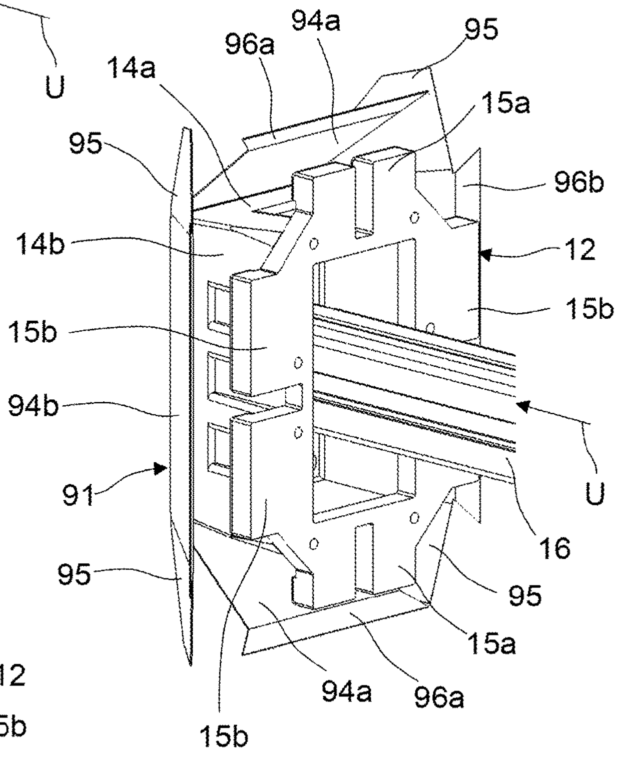
Figure 9C:
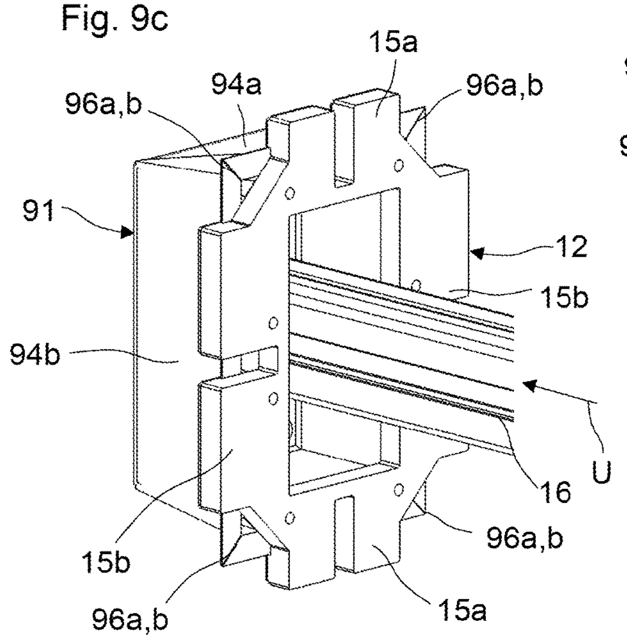

A functional edge 96*a* is connected to each of the first side walls 94*a* facing outward and is connected to the first side wall 94*a* by means of a predefined first fold line 97*a*. A second functional edge 96*b* is further connected to the second side walls 94*b* facing outward and is connected to the second side wall 94*b* by means of a predefined second fold line 97*b*. The functional edges 96*a*, 96*b* are angled laterally outward in the set-up state of the container 92 and form a circumferential sealing or holding edge (see FIG. 8*b*).

The functional edges 96*a*, 96*b* of the set-up container 92 overlap each other in the corner zones in the present embodiment example. The functional edges 96*a*, 96*b* are connected to each other in the overlap region by means of an adhesive connection.

Figure 6:
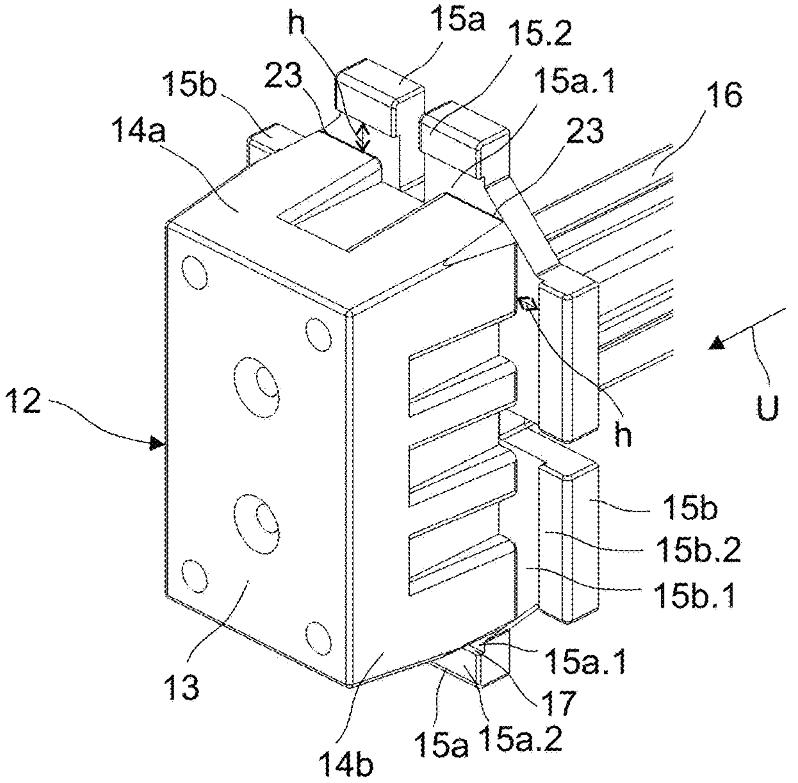
FIG. 6 a perspective view of a forming punch according to the invention.

The forming punch 12 according to the invention according to FIG. 6 includes a punch end face 13 and two first punch sides 14*a* opposite each other and two second punch sides 14*b* opposite each other and disposed perpendicular to the first punch sides 14*a*. The forming punch 12 is correspondingly designed for implementing a container 92 having a rectangular base area or rectangular base.

The punch end face 13 forms an end face. The first and second punch sides 14*a*, 14*b* implement lateral surfaces.

The punch end face 13 interacts with a base part 93 of the flat blank 91 during setting up of the container 92. The first punch sides 14*a* of the forming punch 12 interact with first side wall parts 94*a* during setting up of the container 92, and the second punch sides 14*b* of the forming punch 12 interact with second side wall parts 94*b* of the blank 91 (see also FIGS. 9*a* through 9*c*).

The punch sides 14*a*, 14*b* are disposed at an angle of greater than 90° relative to the punch end face 13, thereby enabling the forming of conical containers 92.

A first flange segment 15*a* is connected to each of the first punch sides 14*a* and a second flange segment 15*b* is connected to each of the second punch sides 14*b*. The flange segments 15*a*, 15*b* are each disposed at an angle to the associated punch sides 14*a*, 14*b* and face outward.

The flange segments 15*a*, 15*b* each form an inner wall segment 15*a*.1, 15*b*.1 to which an outer flange part 15*a*.2, 15*b*.2 is connected.

The inner wall segment 15*a*.1, 15*b*.1 is set back as seen in the forming direction U by means of an offset 17 relative to the outer flange part 15*a*.2, 15*b*.2. The inner wall segment 15*a*.1, 15*b*.1 runs parallel to the punch end face 13 of the forming punch 12 and also faces in the forming direction U.

One corner line 23 is implemented in each case between the punch sides 14*a*, 14*b* and the flange segments 15*a*, 15*b* or the inner wall segments 15*a*.1, 15*b*.1.

The function of the inner wall segment 15*a*.1, 15*b*.1 is described in more detail below in the context of the detailed description of the forming procedure.

The forming procedure, including setting up the container 92 and forming the functional edges 96*a*, 96*b*, is shown in detail in the FIGS. 2 through 5 and 9*a* through 9*c*.

The forming punch 12 is connected to a guide bar 16 brought into linear motion by means of a drive, not shown. For setting up the container 92 from the flat blank 91, the forming punch 12 is displaced toward the blank 91. The punch end face 13 of the forming punch 12 contacts the base part of the blank 91 and pushes the blank 91 into the setup space 24 of the backing device 21 as the motion in the forming direction U continues. When pushing the blank 91 into the backing device 21, the side walls 94*a*, 94*b* are set up. The backing device 21 is furthermore implemented so that the adhesive tabs 95 on the second side walls 94*b* are folded inward and come to rest on the outside of the first side walls 94*a* of the container 92 to be formed and set up.

When setting up the side walls 94*a*, 94*b*, the functional edges 96*a*, 96*b* contact the flange segment 15*a*, 15*b* of the forming punch 12. The interacting of the forming punch 12 and backing device 21 is not sufficient, however, for folding the functional edges 96*a*, 96*b* into the desired, folded position.

To this end, the forming station 12 includes folding aids 18*a*, 18*b*, wherein one folding aid 18*a*, 18*b* is associated with each punch side 14*a*, 14*b* and each flange segment 15*a*, 15*b*.

The folding aids 18*a*, 18*b* each include a folding tool 19*a*, 19*b* having a folding blade and pivotably supported about an axis of rotation F. The folding blade implements one folding edge 20 each. For folding the functional edges 96*a*, 96*b*, the folding tools are each pivoted laterally out of a resting position from outside of the motion zone of the forming punch 12 against the forming punch 12 being displaced in the forming direction U. When pivoting out, the folding tool 19*a*, 19*b* includes a motion component toward the forming punch 12 and in the forming direction U.

The folding edge 20 of the folding tool 19*a*, 19*b* thereby engages in the corner line 23 implemented between the punch side 14*a*, 14*b* and the flange segment 15*a*, 15*b* or the inner wall segment 15*b*.1, 15*b*.1.

For the procedure, the folding tool 19*a*, 19*b* presses the fold line 97*a*, 97*b* of the functional edge 94*a*, 94*b* into the corner line 23, whereby the functional edge 94*a*, 94*b* is folded outward, that is, is bent outward from the associated side wall part 94*a*, 94*b*. The functional edge 94*a*, 94*b* thereby comes to rest against the inner wall segment 15*a*.1, 15*b*.1 of the flange segment 15*a*, 15*b*.

The height h of the inner wall segment 15*a*.1, 15*b*.1 corresponds to the width b of the functional edge 96*a*, 96*b* or is slightly less, so that the functional edge 96*a*, 96*b* folded outward is clamped between the corner line 23 and the offset 17.

The folding tool 19*a*, 19*b* is implemented so that the tool has a dead center point in which the folding edge 20 of the folding tool 19*a*, 19*b* exerts a maximum force in the direction of the corner line 23 on the fold edge 97*a*, 97*b* of the functional edge 96*a*, 96*b*. The dead center point corresponds to a position of the folding tool 19*a*, 19*b* in which the folding edge 20 is at the least distance from the corner line 23.

After passing the dead center point, that is, as the folding tool 19*a*, 19*b* pivots further, the acting force of the folding tool 19*a*, 19*b* drops off again. The folding tool 19*a*, 19*b* thus has a motion component in the forming direction U and away from the forming punch 12 after passing through the dead center point and pivoting further.

The rotary body includes a co-rotating rotary element 25, through which the axis of rotation F leads, for implementing a dead center point and together with the folding tool 19*a*, 19*b* being part of a rotary body rotatable about the axis of rotation F. The rotary element 25 has the cross-sectional shape of an equilateral triangle in the present embodiment example. Other cross-sectional shapes are, however, also conceivable. The rotary element 25 implements a force transfer contact together with a guide element 26.

The rotary element 25 implements a contact region along the circumference thereof, at which a maximum radial distance to the outer circumference of the rotary element 25 from the axis of rotation F is present, and at which the guide element 26 correspondingly exerts a maximum compressive force on the rotary element 25 and thus on the folding tool 19*a*, 19*b* by means thereof. The contact region, implemented in the present embodiment example by an edge of the equilateral triangle, forms a dead center point together with the guide element 25, in that the radial distance to the outer circumference of the rotary element 25 from the axis of rotation F and thus the compressive force on the rotary element 25 drops off before and after the contact region. It is understood that the associated force vector does not lead through the axis of rotation F.

In the present embodiment example, the folding tool 19*a*, 19*b* is passively driven by the forming punch 12. To this end, the folding aids 18*a*, 18*b* each include one stop element 22 coupled to the folding tool 19*a*, 19*b* and also rotatably supported about the axis of rotation F. The stop element 22 and the folding tool 19*a*, 19*b* are part of the rotary body rotatable about the axis of rotation F.

The stop element 22 protrudes into the motion zone of the forming punch 12 before the forming punch 12 as seen in the forming direction U during the forming procedure. The forming punch 12 then pushes the stop element 22 away in the forming direction U during the forming procedure, whereby the element is set in rotary motion, the motion being transferred to the folding tool 19*a*, 19*b*.

The folding tools 19*a*, 19*b* each interact with a return lever 88 being actuated, that is, being set in motion by the returning forming punch 12, that is, when the forming punch 12 returns in the return stroke after setting up the container 92.

By actuating the return lever 88, the folding tool 19*a*, 19*b* is pivoted back into the resting position outside of the motion zone of the forming punch 12 after the forming procedure.

After forming, that is, setting up the containers 92 in the forming station 10, the set-up container 92 is transferred to the turning device 31. The turning device 31 includes a turning body 32 rotatably supported about a vertical axis of rotation D. The turning body 32 includes four container receivers 33*a*-33*c*, each disposed at an angle of 90° (angular degrees) about the axis of rotation D.

The container receivers 33*a*-33*c* include stop strips each implementing a closed frame as a single part enclosing a container receptacle space 35.

The container receivers can, however, also include stop strips made of a plurality of parts and adjustable to correspond to different container dimensions.

The set-up containers 92 is pushed by the forming punch 12 in the forming direction U into the container receptacle space 35 of the container receiver 33*c* facing toward the forming punch 12 in the last step of the forming procedure. The circumferential functional edge 96*a*, 96*b* of the container 92 thereby contacts the frame of the container receiver 33*c*.

The turning body 32 is rotated by 90° per forming cycle, so that the container receiver 33*c* is displaced away from the forming station 10 together with the set-up container 92, and an empty container receiver is displaced toward the forming station 10 and is positioned opposite the forming punch 12.

It is fundamentally possible that the turning body 32 includes only two container receivers, each disposed at an angle of 180° (angular degrees) about the axis of rotation D. In this case, the turning body 32 is rotated by 180° per forming cycle.

After rotating the container receiver 33*c* having the set-up container 92 by a total of 180°, potentially after two or one forming or working cycles, depending on the number of container receivers on the turning body 32, the container 92 lies in an ejecting position rotated by 180° relative to the original forming position thereof. The container opening 99 thereby faces in the opposite direction in the ejecting position relative to the forming position.

The container 92 is then pushed into the container receiving space 55 of the stack guide 52 of the discharging device 51 having the container opening 99 facing forward. The container 92 is thereby pushed over the preceding container 92 in each case having the container opening 55 facing forward for forming a container stack 54.

For ejecting the container 92 from the container receiver 33*c*, the turning body 32 includes ejectors 34*a*, 34*b*, the ejecting axis thereof running in parallel to the working axis W of the forming punch 12 in the ejecting position.

According to the present embodiment example, one ejector 34*a*, 34*b* each is implemented displaceable in two opposite directions for a pair of container receivers 33*a*, 33*c* opposite each other. The ejector 34*a*, 34*c* correspondingly implements two contact regions opposite each other.

The ejector 34*a*, 34*b* is passively driven by means of the forming punch 12, in that the forming punch 12 pushes the ejector 34*a*, 34*b* away when pushing the set-up container 92 into the container receiver 33*c* by forming a pushing contact with a first contact region in the forming direction U. For the procedure, the ejector 34*a*, 34*b* pushes the container 92 set up in the preceding working cycle out of the opposite container receiver 33*a* into the container receiver space 55 of the stack guide 52 by means of the opposite second contact region.

Because the ejector 34*a* implements the pushing contact with the outer side of the container base 93 when pushing the container 92 into the container receiving space 55 of the stack guide 52, the ejector 34*a* can be pivoted together with the turning body 32 about the axis of rotation D of the turning body 32 after ejecting the container 92 out of the container receiver 33*a*, particularly without the ejector 34*a* first needing to be displaced back in the opposite direction out of the container receiving space 55 of the stack guide 52.

FIGS. 10*a* and 10*b* show a particular embodiment of a container receiver 133 allowing the forming of a stack of set-up and nested containers 92 having circumferential functional edges 96*a*, 96*b*, wherein the containers 92 are each pushed into the container stack having the container base 93 facing forward.

The problem for the present type of stacking is that the functional edges 96*a*, 96*b* are straightened out again when pushing the containers 92 into each other. The problem can be solved in that the functional edges 96*a*, 96*b* are connected to each other by means of an adhesive connections in overlap regions (see e.g. FIGS. 8*a* and 8*b*).

The container receiver 133 is thus designed for implementing the adhesive connection and for forming a container stack of the type indicated above.

To this end, the container receiver 133 includes a pair of two flange stop strips 136*a*, 136*b* disposed parallel to each other and spaced apart from each other. The container receptacle space 135 is disposed between the flange stop strips 136*a*, 136*b*.

The pair of flange stop strips 136*a*, 136*b* form a stop for two functional edges 96*b* running parallel to each other and spaced apart from each other and laterally delimiting the container receptacle 100 of the set-up container 92.

The flange stop strips 136*a*, 136*b* serve as backing devices for the forming punch 12, in that the two functional edges 96*b* of the set-up container 92 contact the flange stop strips 136*a*, 136*b* when pushing the container 92 into the container receptacle space 135 of the container receiver 133. The flange segments 15*b* of the forming punch 12 thereby press the functional edges 96*b* of the set-up container 92 against the flange stop strips 136*a*, 136*b*.

Adhesive connections in the overlap region of the functional edges 96*a*, 96*b* are completed by the press force. To this end, the forming punch 12 and flange stop strips 136*a*, 136*b* briefly remain in the clamping position. The adhesive is thereby given the necessary time for curing and bonding.

For the procedure, the forming punch 12 pushes the set-up container 92 having the container base 93 facing forward into the rearmost container of a container stack (not shown) formed in the stack guide. The procedure is shown schematically in DE 10 24 82 31 A1 (FIG. 1), for example.

The flange stop strips 136*a*, 136*b* are thus displaceable relative to each other such that the distance between the pair of flange stop strips 136*a*, 136*b* can be modified.

To this end, the flange stop strips 136*a*, 136*b* are connected to guide slides 142*a*, 142*b*; 143*a*, 143*b*. The guide slides 142*a*, 142*b*; 143*a*, 143*b* are displaceably supported along guide rails 141*a*, 141*b* running perpendicular to the working axis W.

The guide rails 141*a*, 141*b* and the guide slides 142*a*, 142*b*; 143*a*, 143*b* and the flange stop strips 136*a*, 136*b* are disposed on a support structure.

The flange stop strips 136*a*, 136*b* are displaceable along the guide rails by means of a pneumatic drive (pneumatic cylinder). Alternative drives, such as a hydraulic drive (hydraulic cylinder) or a linear motor are also possible.

In the embodiment of the setting up procedure, the flat blank 91 is pushed into the backing device 21 by the forming punch 12 and thereby set up as described further above. To this end, the forming punch 12 is disposed on a driven guide bar 16.

The forming punch 12 pushes the set-up container 92 into the container receptacle space 135 of the container receiver 133 after the setting up procedure until the side functional edges 96*b* of the set-up container 92 contact the flange stop strips 136*a*, 136*b* present in a stop position.

The container receiver 133 is thus displaced together with the forming punch 12 in the forming direction U, particularly synchronously displaced. During the phase, a press force is exerted on the side functional edges 96*b* by the side flange segments 15*b*, wherein the flange stop strips 136*a*, 136*b* serve as a backing device.

At the same time, for the procedure, the set-up containers 92 are pushed into the container stack in the stack guide having the container base 93 facing forward.

The support structure is connected to guide slides 147 displaceable along guide rails 146 running parallel to the working axis W for displacing the support structure of the container receiver 133 along the working axis W together with the components disposed thereon.

The slide guides indicated above are shown only as one potential embodiment variant for implementing the displaceability.

The container receiver 133 is displaced along the working axis W by means of a pneumatic drive (pneumatic cylinder) 145. Alternative drives, such as a hydraulic drive (hydraulic cylinder) or a linear motor are also possible.

The forming punch 12 is then displaced back into the initial position thereof in a return stroke.

For releasing the container 92 pushed into the container stack, the flange stop strips 136*a*, 136*b* are displaced laterally outwardly from the stop position into the release position by means of the slide guide 141*a*, 141*b*, 142*a*, 142*b*, 143*a*, 143*b* for enlarging the container receptacle space 135, until the inner edges 137*a*, 137*b* of the flange stop strips 136*a*, 136*b* are outside of the outer edges of the functional edges 96*b*.

The container receiver 133 together with the flange stop strips 136*a*, 136*b* thereof is then displaced back out of the stacking position, past the functional edge 96*b*, into the initial position.

For the procedure, the flange stop strips 136*a*, 136*b* are also displaced back toward each other into the stop position thereof. A new forming cycle can then be initiated.

The flange stop strips 136*a*, 136*b* can perform the function of folding aids or can be implemented as part of a folding aid as previously described in the general description. The flange stop strips 136*a*, 136*b* accordingly also implement (displaceable) folding tools. The flange stop strips 136*a*, 136*b* can thereby engage in the corner zone between the punch side and the flange segment and thus bring about the folding of the functional edge and conclude the procedure.

The invention claimed is:

1. A device for setting up containers along fold lines from flat blanks, having a forming station comprising a forming tool having a displaceable forming punch and a backing device for setting up the containers from the blanks, and having a discharging device for carrying away the set-up containers from the forming station, the forming punch comprising a punch end face interacting with a base part of the blank when setting up a container, and two first punch sides arranged opposite each other and two second punch sides arranged opposite each other, and the punch sides leading laterally away from the punch end face at an angle, wherein the first punch sides acting on first side wall parts and the second punch sides acting on second side wall parts of the blank when setting up the container, wherein first flange segments facing laterally outward in a forming direction are connected to the first punch sides and are disposed at an angle to the first punch sides, and second flange segments facing laterally outward in the forming direction are connected to the second punch sides and are disposed at an angle to the second punch sides and the forming tool comprises two first folding aids each having a displaceable folding tool able to interact with the first flange segments and two second folding aids each having a displaceable folding tool able to interact with the second flange segments such that functional edges of the blank protruding laterally outward are folded out of the blank when setting up the container.

2. The device according to claim 1, wherein the flange segment comprises an inner wall segment and an outer flange part, and the inner wall segment is set back by an offset relative to the outer flange part as seen in the forming direction.

3. The device according to claim 2, wherein a height of the inner wall segment corresponds to a width of the functional edge.

4. The device according to claim 1, wherein the displaceable folding tool is able to act in a corner zone formed between a first punch side and a flange segment when forming the container.

5. The device according to claim 4, wherein the folding tool is pivotable toward the corner zone.

6. The device according to claim 1, wherein the folding tool implements a folding edge.

7. The device according to claim 1, wherein the folding aids in each case comprise a stop element designed such that the forming punch displaced in the forming direction while setting up the container contacts the stop element and sets the stop element in motion, wherein the stop element is coupled to the folding tool such that the folding tool is displaced toward the flange segment by the motion of the stop element.

8. The device according to claim 1, wherein the device comprises at least one flange stop, particularly at least one pair of flange stops displaceable relative to each other, disposed ahead of a stack guide of the discharging device in the forming direction for clamping at least one functional edge during the forming or setting up.

9. The device according to claim 8, wherein the at least one flange stop comprises a folding aid or the at least one folding aid having the displaceable tool able to interact with the flange segment of the forming punch such that a functional edge protruding laterally outward is folded out of the blank when setting up the container.

10. A method for setting up containers along fold lines from flat blanks by means of a device according to claim 1, having the following steps:

introducing the blank into the forming station;

displacing the forming punch toward the blank in the forming direction;

pressing the blank into the setup space of the backing device by the forming punch and folding and forming the blank, and particularly the functional edge, by the forming punch; and fully setting up the container from the blank, wherein the folding tool of the folding aids in each case is brought together with the flange segment during the setting up of the container, and the folding tool acts on the blank and interacts with the flange segment such that a functional edge offset laterally outward is folded out of the blank.

11. The method according to claim 10, wherein the folding tool of the folding aids acts in a corner zone implemented between the at least one punch side and the flange segment during the setting up of the container.

12. A device for setting up containers along fold lines from flat blanks, having a forming station comprising a forming tool having a displaceable forming punch and a backing device for setting up the containers from the blanks, and having a discharging device for carrying away the set-up containers from the forming station, the forming punch comprising a punch end face interacting with a base part of the blank when setting up a container, and at least one first punch side leading laterally away from the punch end face at an angle and acting on a side wall part of the blank when setting up the container, wherein a flange segment facing laterally outward in a forming direction is connected to the at least one first punch side and is disposed at an angle to the first punch side, and the forming tool comprises at least one folding aid having a folding tool with a fold effective tool section, the fold effective tool section being displaceable in order to interact with the flange segment and to act in a corner zone formed between the at least one first punch side and the at least one flange segment such that a functional edge protruding laterally outward is folded out of the blank while the blank is moved in the forming direction into a container receptacle space for setting up the container, and wherein the fold effective tool section of the folding tool is movable out of the container receptacle space with a movement component transverse to the forming direction after setting up the container.

13. The device according to claim 12, wherein the at least one first punch side encompassing two first punch sides opposite each other and leading away from the punch end face laterally at an angle, and each acting on a first side wall part of the blank when forming the container, and a first flange segment is connected to each of the first punch sides, each of the first flange segments facing laterally outward as seen in the forming direction and being disposed at an angle to the first punch side to which they are connected, and the at least one folding aid encompassing two first folding aids each having a displaceable folding tool each being able to interact with one of the first flange segments such that, in each case, a first functional edge protruding laterally outward is folded out of the blank when setting up the container.

14. The device according to claim 13, wherein the two first functional edges are disposed transverse to a transport direction of the blank.

15. The device according to claim 13, wherein the at least one first punch side encompassing two second punch sides opposite each other and leading away from the punch end face laterally at an angle, and each acting on a second side wall part of the blank when forming the container, and a second flange segment facing laterally outward as seen in the forming direction is connected to each of the second punch sides and is disposed at an angle to the second punch side, and the at least one folding edge encompassing two second folding aids each having a displaceable folding tool with a fold effective tool section, the fold effective tool section in each case being able to interact with a second flange segment such that in each case a second functional edge protruding laterally outward is folded out of the blank when setting up the container.

16. The device according to claim 12, wherein the folding tool implements a folding edge.

17. The device according to claim 12, wherein the folding tool is pivotable toward the corner zone.

18. The device according to claim 12, wherein the at least one folding aid comprises a stop element designed such that the forming punch displaced in the forming direction while setting up the container contacts the stop element and sets the stop element in motion, wherein the stop element is coupled to the folding tool such that the folding tool is displaced toward the flange segment by the motion of the stop element.

19. The device according to claim 12, wherein the device comprises at least one flange stop, particularly at least one pair of flange stops displaceable relative to each other, disposed ahead of a stack guide of the discharging device in the forming direction for clamping at least one functional edge during the forming or setting up.

20. The device according to claim 19, wherein the at least one flange stop comprises a folding aid or the at least one folding aid having the displaceable folding tool able to interact with the flange segment of the forming punch such that a functional edge protruding laterally outward is folded out of the blank when setting up the container.

* * * * *